(12) United States Patent
HomChaudhuri et al.

(10) Patent No.: US 10,539,996 B2
(45) Date of Patent: Jan. 21, 2020

(54) WIFI MEMORY POWER MINIMIZATION

(71) Applicant: QUALCOMM Incorporated, San Diego, CA (US)

(72) Inventors: Sandip HomChaudhuri, San Jose, CA (US); Douglas Dahlby, Stone Ridge, VA (US); Murali Krishna, San Diego, CA (US); Harinder Singh, Saratoga, CA (US); Ravi Konda, San Jose, CA (US); BalaSubrahmanyam Chintamneedi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 142 days.

(21) Appl. No.: 15/798,778

(22) Filed: Oct. 31, 2017

(65) Prior Publication Data
US 2018/0150123 A1 May 31, 2018

Related U.S. Application Data

(60) Provisional application No. 62/427,107, filed on Nov. 28, 2016.

(51) Int. Cl.
*G06F 9/00* (2006.01)
*G06F 1/3234* (2019.01)
(Continued)

(52) U.S. Cl.
CPC .......... *G06F 1/3275* (2013.01); *G06F 1/3287* (2013.01); *G06F 1/3293* (2013.01);
(Continued)

(58) Field of Classification Search
CPC .... G06F 1/3275; G06F 1/3287; G06F 1/3293; G06F 1/3296; G06F 9/4418;
(Continued)

(56) References Cited

U.S. PATENT DOCUMENTS

| 6,055,603 A * | 4/2000 | Ofer ................... G06F 12/0866 710/54 |
| 9,146,892 B2 * | 9/2015 | Lindsay ................ G06F 1/3206 |

(Continued)

OTHER PUBLICATIONS

Frogatto & Friends; "What Every Programmer Should Know About Memory Management" by Sirp, Oct. 30, 2009, 4 pages.
(Continued)

*Primary Examiner* — Aurel Prifti
(74) *Attorney, Agent, or Firm* — Paradice and Li LLP

(57) ABSTRACT

The disclosure relates to minimizing power consumption of a WiFi system-on-chip (SOC) during idle periods. The disclosed architecture includes memory banks for the WiFi SoC's embedded processor that can be independently powered on/off and a Memory Management Unit (MMU) to translate virtual addresses to physical addresses and generate exceptions to process accesses to virtual addresses without a corresponding physical address. The architecture can implement a demand paging scheme whereby a MMU fault from an access to code/data not within the embedded memory causes the processor to fetch the code/data from an off-chip secondary memory. To minimize page faults, the architecture stores WiFi client code/data within the embedded processor's memory that is repeatedly accessed with a short periodicity or where there is an intolerance for delays of accessing the code/data.

25 Claims, 10 Drawing Sheets

(51) Int. Cl.

| | | |
|---|---|---|
| *G06N 20/00* | (2019.01) | |
| *G06N 7/00* | (2006.01) | |
| *H04W 52/02* | (2009.01) | |
| *G06F 1/3287* | (2019.01) | |
| *G06F 1/3293* | (2019.01) | |
| *G06F 1/3296* | (2019.01) | |
| *G06F 9/4401* | (2018.01) | |
| *G06F 12/1009* | (2016.01) | |
| *G06F 13/42* | (2006.01) | |
| *G06F 12/02* | (2006.01) | |
| *G06F 12/123* | (2016.01) | |
| *G06F 12/0862* | (2016.01) | |
| *G06F 12/128* | (2016.01) | |
| *G06N 3/04* | (2006.01) | |
| *G06N 3/08* | (2006.01) | |

(52) U.S. Cl.
CPC .......... *G06F 1/3296* (2013.01); *G06F 9/4418* (2013.01); *G06F 12/0215* (2013.01); *G06F 12/0862* (2013.01); *G06F 12/1009* (2013.01); *G06F 12/123* (2013.01); *G06F 12/128* (2013.01); *G06F 13/4282* (2013.01); *G06N 7/005* (2013.01); *G06N 20/00* (2019.01); *H04W 52/028* (2013.01); *G06F 2212/602* (2013.01); *G06F 2212/621* (2013.01); *G06F 2212/65* (2013.01); *G06F 2212/654* (2013.01); *G06F 2213/0026* (2013.01); *G06N 3/0445* (2013.01); *G06N 3/084* (2013.01); *Y02D 10/44* (2018.01); *Y02D 70/00* (2018.01); *Y02D 70/10* (2018.01); *Y02D 70/1262* (2018.01); *Y02D 70/14* (2018.01); *Y02D 70/142* (2018.01); *Y02D 70/146* (2018.01); *Y02D 70/26* (2018.01)

(58) Field of Classification Search
CPC ............. G06F 12/0215; G06F 12/0862; G06F 12/1009; G06F 12/123; G06F 13/4282; G06F 1/3206; G06F 1/324; G06N 20/00; G06N 7/005; H04W 52/028; G11C 5/14; G11C 11/4074; G11C 29/021; G11C 29/022
USPC .......... 713/324, 2, 320; 712/30, 34; 370/389
See application file for complete search history.

(56) References Cited

U.S. PATENT DOCUMENTS

| | | | |
|---|---|---|---|
| 9,396,070 B2 * | 7/2016 | Shabel | G06F 11/141 |
| 2004/0003300 A1 | 1/2004 | Malueg et al. | |
| 2006/0034275 A1 * | 2/2006 | Roberts | G06F 13/385 370/389 |
| 2007/0006000 A1 | 1/2007 | Jain et al. | |
| 2007/0294496 A1 | 12/2007 | Goss et al. | |
| 2008/0082841 A1 * | 4/2008 | Juenemann | G06F 1/3203 713/300 |
| 2009/0077307 A1 | 3/2009 | Kaburlasos et al. | |
| 2010/0070691 A1 * | 3/2010 | Kwon | G06F 13/1663 711/103 |
| 2010/0095089 A1 * | 4/2010 | Kwon | G06F 9/544 712/30 |
| 2010/0153686 A1 * | 6/2010 | Frank | G06F 9/3851 712/34 |
| 2011/0029752 A1 | 2/2011 | Sutardja et al. | |
| 2011/0145609 A1 | 6/2011 | Berard et al. | |
| 2011/0258426 A1 * | 10/2011 | Mujtaba | G06F 21/57 713/2 |
| 2011/0264937 A1 * | 10/2011 | Meisner | G06F 1/3228 713/323 |
| 2011/0320749 A1 | 12/2011 | Gonion et al. | |
| 2016/0091957 A1 * | 3/2016 | Partiwala | G06F 1/3243 713/323 |
| 2016/0124490 A1 * | 5/2016 | Kupermann | G06F 1/3225 713/324 |
| 2016/0352949 A1 * | 12/2016 | Niimura | H04N 1/00896 |
| 2017/0371394 A1 | 12/2017 | Chan et al. | |
| 2018/0004273 A1 * | 1/2018 | Leucht-Roth | G06F 1/3215 |
| 2018/0107598 A1 | 4/2018 | Prodromou et al. | |
| 2018/0150124 A1 | 5/2018 | Homchaudhuri et al. | |
| 2018/0150125 A1 | 5/2018 | Homchaudhuri et al. | |

OTHER PUBLICATIONS

International Search Report and Written Opinion—PCT/US2017/059563—ISA/EPO—dated Feb. 8, 2018.
Franklin M.A., et al., "Computation of Page Fault Probability from Program Transition Diagram", Communications of the ACM, Apr. 1974, vol. 17, Issue 4, pp. 186-191, (Year: 1974).
Joseph D., et al., "Prefetching using Markov predictors", Proceeding ISCA '97 Proceedings of the 24th Annual International Symposium on Computer Architecture, pp. 252-263, (Year: 1997).
Butt A. R,. et al., "The Performance Impact of Kernel Prefetching No Buffer Cache Replacement Algorithms", URL: https://www2.cs.arizona.edu/~gniady/papers/sigm05_prefetch.pdf (Year: 2005), 12 Pages.
Huang H., et al., "Improving Energy Efficiency by Making DRAM Less Randomly Accessed", URL: https://dl.acm.org/citation.cfm?id=1077603.1077696 (Year: 2005), pp. 1-6.

* cited by examiner

WIFI MEMORY POWER MINIMIZATION

CROSS-REFERENCE TO RELATED APPLICATIONS

The present application claims the benefit under 35 U.S.C. § 119(e) of U.S. Provisional Patent Application No. 62/427,107, filed on Nov. 28, 2016, entitled "WIFI MEMORY POWER MINIMIZATION," the contents of which is hereby incorporated by reference herein.

TECHNICAL FIELD

The following relates generally to wireless communication, and more specifically to systems and methods for minimizing the memory power requirements of a WiFi client.

BACKGROUND

Wireless communications systems are widely deployed to provide various types of communication content such as voice, video, packet data, messaging, broadcast, and so on. Wi-Fi or WiFi (e.g., IEEE 802.11) is a technology that allows electronic devices to connect to a wireless local area network (WLAN). A WiFi network may include an access point (AP) that may communicate with one or more other computing devices. The AP may be coupled to a network, such as the Internet, and may enable a connected device to communicate via the network or with other devices coupled to the AP.

Mobile electronic devices (e.g., cellular phones, tablets, laptops, etc.) have grown in popularity and use. To keep pace with increased consumer demands, mobile devices have become more feature-rich, and now commonly include multiple system-on-chips (SOCs) including WiFi SOCs. In some cases a mobile device may have a limited amount of battery power. Thus, the wireless clients of mobile devices in a WLAN that are not actively transmitting/receiving information via the network may enter a sleep (or idle state) to conserve power, where the wireless clients do not actively transmit/receive information in the sleep state. These wireless clients may further wake up periodically for a short period of time to check for messages, for example, beacons frames transmitted by an AP to announce the presence of a WLAN.

SUMMARY

Power consumption during idle periods between bursts of active traffic is a major competitive performance benchmark for mobile WiFi products. While standing by, the WiFi client can sleep for brief intervals, but has to wake periodically to listen to beacons sent by the WiFi Access Point that the WiFi client is associated with. The WiFi client can minimize the power required by listening for beacons through smart algorithms that enable starting to listen for beacons as late as possible, terminating listening as early as possible, using low-power RF hardware for the listening, doing basic processing of the received beacon within hardware, and only listening for every Nth beacon rather than every beacon. These beacon reception power optimizations, collectively known as "DTIM Mode", allow the WiFi client's embedded processor to sleep for extended periods, and only wake up when a beacon of particular interest is seen.

Having these DTIM Mode power optimizations in place, one of the largest remaining contributors to the WiFi client's standby power consumption is the power required to maintain the memory contents of the WiFi client's embedded processor. This problem becomes particularly acute when the system is only listening to every Nth beacon. For example, in the "DTIM10" mode of operation, wherein the WiFi client wakes to listen to every 10th beacon sent by the Access Point, the leakage current of the memory used by the WiFi client's embedded processor could easily contribute to more than 50% of the WiFi system's power consumption. This is a particular issue with WiFi solutions that are discrete/SoCs with on-chip SRAM memory that the code runs out of. Further optimization of WiFi client standby power consumption needs to minimize the power required to maintain the contents of the client's embedded processor's memory.

One solution is to burn the code used by the WiFi embedded processor during standby mode into read-only (ROM) memory, which is cheaper from a cost and power perspective from RAM memory. This solution may be inadequate due in part to the nature of ROM memory. For example, the ROM contents are immutable; thus fixing bugs or adding new features within the WiFi embedded processor's standby-mode code becomes extremely complex. ROM is only suitable for code or data that never changes. By nature, the overwhelming majority of the data used by the WiFi embedded processor changes; most of the WiFi embedded processor's data needs to be stored in read/write memory, to allow the WiFi embedded processor to modify its own data. As a product's ROM code becomes outdated due to bugs or inadequate features, a ROM spin can be performed, wherein newly-manufactured devices are given updated ROM contents. However, this creates a vast difficulty for commercially supporting both the old devices that have the outdated ROM contents, and the new devices that have updated ROM contents.

Another solution is to directly access code or data within a secondary memory, typically a Dual Data Rate (DDR) memory bank that's part of the larger platform, via a connecting bridge such as PCIe. This solution also has some disadvantages. As one example, there is a security risk that some other processor or peripheral will be able to subvert the WiFi embedded processor by modifying the WiFi embedded processor's code that is stored in secondary memory. To avoid this risk, the secondary memory has to be inaccessible to other processors or peripherals. However, providing a protected secondary memory is not feasible in many WiFi systems. As another example, for systems in which access to secondary memory would involve waking a sleeping host/apps processor, the solution of storing the WiFi embedded processor's code or data in secondary memory cannot be utilized during operating modes when the host/apps processor is sleeping. Typically, accessing the secondary memory, such as a DDR bank, requires the larger platform to exit the lowest power state. However, those standby periods are precisely when the WiFi embedded processor would need to rely on the secondary memory, to minimize the power consumed by the WiFi embedded processor's own memory.

The above-described problems, among others, are addressed in some embodiments by the disclosed systems and techniques for minimizing power consumption of a WiFi client, for example a WiFi system-on-chip (SOC), during idle periods. The disclosed technology provides a holistic new architecture for saving memory power that can cut down leakage by 50% and also adapt dynamically. The architecture can include memory banks for the WiFi SoC's embedded processor that can be independently powered on/off. The architecture can include a Memory Management Unit (MMU) to translate virtual addresses to physical addresses and generate exceptions to process accesses to virtual addresses without a corresponding physical address. The architecture can implement a demand paging scheme whereby a MMU fault from an access to code/data not within the embedded memory causes the processor to fetch the code/data from an off-chip secondary memory. To minimize page faults, the architecture can identify WiFi client code/data that is repeatedly accessed with a short periodicity (e.g., a small amount of time elapsed between successive accesses) or where there is an intolerance for delays of accessing the code/data and store such code/data within the embedded processor's memory. Such determination of repeated access of code/data can be made statically or dynamically. The architecture can also remove unaccessed pages from the embedded processor's memory and power down vacant memory banks. The architecture also allows for several routes for the WiFi SoC to access the platform DDR in ways that obviates the significant power impact as seen in previous sytems where the Applications Processor is involved in the process.

Accordingly, one aspect relates to a system comprising a host system including a host processor configured to be operated in a sleep state and a host memory; a WiFi system including a computer-readable memory storing instructions to control operations of the WiFi system, an embedded processor configured by the instructions in the computer-readable memory, and an embedded memory configured for storing one or both of code and data usable during the operations of the WiFi system, the embedded memory including a resident memory portion and a pageable memory portion; and a communications bus configured to provide data communications between at least the embedded memory and the host memory; wherein the instructions configure the embedded processor to fetch a page from the host memory into the pageable memory portion without waking the host processor from the sleep state.

Another aspect relates to a method comprising, under control of one or more computing devices determining, via an embedded processor of a system on chip, to fetch a page from a host memory of a host system including the host memory and a host processor configured to be operated in a sleep state; identifying that the host processor is operating in the sleep state; and in response to identifying that the host processor is operating in the sleep state, fetching the page from the host memory into an embedded memory of the system on chip without waking the host processor from the sleep state.

Another aspect relates to a system on chip comprising a computer-readable memory storing instructions to control operations of the system; an embedded processor configured by the instructions in the computer-readable memory; and an embedded memory configured for storing one or both of code and data usable during the operations of the system, the embedded memory including a resident memory portion and a pageable memory portion; wherein the instructions configure the embedded processor to transfer, via a communications bus, a page between the pageable memory portion and a secondary memory of a host system outside of the system on chip without waking a host processor associated with the secondary memory.

Another aspect relates to a device comprising a host system including a host processor configured to be operated in a sleep state and a host memory; a system on chip including a computer-readable memory storing instructions to control operations of the system on chip, an embedded processor configured by the instructions in the computer- readable memory, and an embedded memory configured for storing pages usable during the operations of the system on chip; and a communications channel configured to provide data communications between at least the embedded memory of the system on chip and the host memory; wherein the instructions configure the embedded processor to transfer a page between the embedded memory and the host memory without waking the host processor from the sleep state.

DETAILED DESCRIPTION

Figure 1:
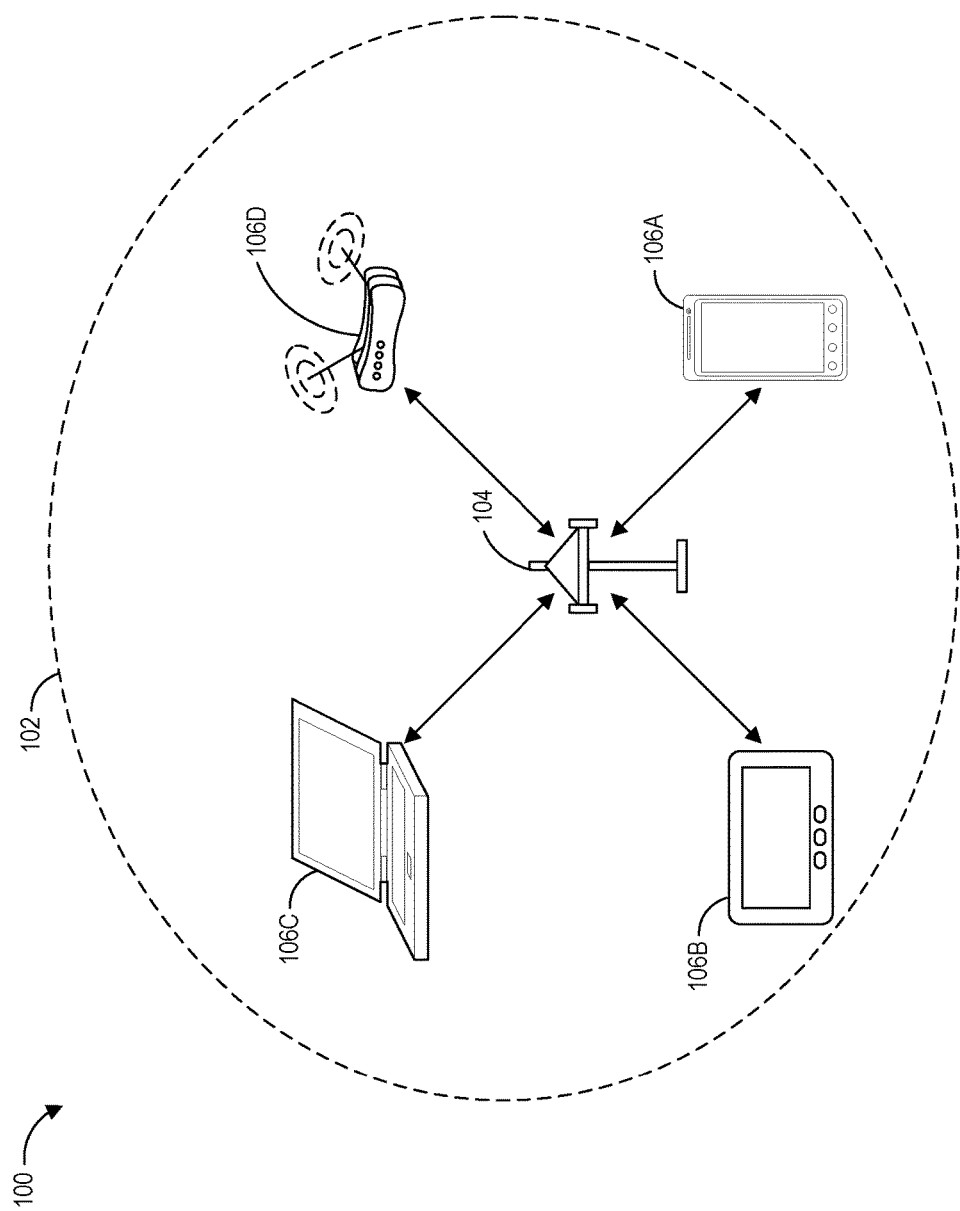
FIG. 1 depicts an exemplary wireless communication system in which aspects of the present disclosure may be employed.

Aspects of the present disclosure relate to systems and techniques for reducing the amount of power consumed by memory in a WiFi system or other system on chip (SOC). For example, the WiFi system can be a SOC coupled with a host device system including a host processor and host memory. When a device is not actively transmitting data via a wireless network the host system can enter a sleep mode to conserve power. The WiFi system can also enter a low power mode, for example by lengthening the time between trying to detect wireless signals from other devices. In such a low power mode, maintaining the memory bank embedded in the WiFi system can be one of the significant power consumptions of the WiFi system. Accordingly, the disclosed systems and techniques can manage the embedded WiFi memory so that portions are emptied and powered down when not in use, thereby further reducing power consumption in the low power mode. The memory can include two sections: a "resident" memory that continuously stores code and/or data and thus is continuously powered, and a "pageable" memory that stores pages of code and/or data as needed. Powering down portions of the embedded WiFi memory can involve identifying code and data that should be kept in a resident memory that is continuously powered and identifying other code and data that can be temporarily stored in a portion of a pageable memory and then cleared to power down that portion. The WiFi system can access data or code in a secondary memory (a memory of the host system), for example to fetch this data or code for temporary storage in the pageable memory. The disclosed systems and techniques can access the secondary memory without waking up the host processor, thereby avoiding the power spikes required to power the host processor.

The disclosed systems and techniques can implement a modified version of demand paging (referred to herein as "power-optimization demand paging") to achieve some of the disclosed power reductions. Paging is a memory management scheme by which a system stores and retrieves data from secondary storage for use in main memory, for example in blocks called pages, thereby using secondary storage to allow programs to exceed the size of available physical memory. Demand paging is a form of paging by which a system copies a page of data into physical memory only if an attempt is made to access it and that page is not already in memory (referred to as a "page fault"). A process can begin execution with none of its pages in physical memory, and many page faults can occur until most of a process's working set of pages is located in physical memory. Typically, demand paging is implemented to manage data with respect to a fixed quantity of storage in order to reduce storage costs. Power-optimization demand paging as described herein can used to clear unused code and data from specific portions or banks of pageable memory and subsequently power down those portions or banks until they are needed again. For example, the power-optimization demand paging techniques can identify pages in one or more banks of the pageable memory that are not presently in use in the WiFi system low power mode, evict or clear those pages from the pageable memory, and power down the one or more banks. In some embodiments pages not being used frequently are stored to the secondary memory, for example, without waking up the host processor arranged with the secondary memory. The power-optimization demand paging can turn a powered-down bank back on when it is needed for temporary storage of code or data.

The disclosed systems and techniques for minimizing the power consumed by the memory of the embedded processor of the WiFi client during standby mode can include the following features.

Aspects can provide memory banks for the WiFi client's embedded processor which can be independently powered on/off. For example, portions or banks of pageable memory can be powered down when not in use and powered on when needed.

Aspects can include a Memory Management Unit (MMU) that can translate virtual addresses to physical addresses, and which can generate exceptions to process accesses to virtual addresses that don't currently have a corresponding physical address. For example, the MMU can generate a fault in response to an access attempt to code or data that is not currently present within the WiFi system's embedded memory (also referred to herein as a page fault).

Aspects can implement a power-optimization demand paging scheme to power off unused pageable memory and power on portions of the pageable memory on an as-needed basis. For example, a page fault can cause the embedded processor's operating system to fetch the accessed page of code or data from an off-chip secondary memory (for example, a memory of the host device), power on a portion of the pageable memory if needed for temporary storage of the page, and store the page in a bank of the pageable memory. Once the WiFi system is no longer using the page, the power-optimization demand paging scheme can evict the page from the pageable memory bank and power down the bank if it is not storing any other in-use pages.

Aspects can implement a security signature for each page, to confirm that the page was not modified while it was in secondary memory. In some embodiments, the security signature can be validated by a dedicated hardware (HW) engine (over the entire page) or part of the direct memory access (DMA) engine that fetches in the pages (while streaming in). In some embodiments, the security signature can be validated by the software (SW) code running on the embedded processor. Aspects can verify each fetched page's security signature inline by one or more of a DMA HW, the embedded WiFi processor, a secondary embedded processor, or a HW security engine.

Aspects can identify the WiFi client code and data that needs to be permanently resident within the embedded processor's resident memory. For example, this client code/data can be identified due to intolerance for delays of accessing the code or data. As another example, this can include WiFi client code and data that is accessed repeatedly with a periodicity small enough to cause the power consumed by keeping the code or data permanently present within the embedded processor's memory to be exceeded by the power consumed by repeatedly fetching the page of code or data from the secondary memory into the embedded processor's memory. Aspects can also identify code and data that can be fetched, stored in, and cleared from the pageable memory while achieving power savings. This identification can be performed manually in some embodiments, for example based on studies of code and data usage during a WiFi low power mode. Some embodiments can include profiling engines that can log code and data usage and dynamically determine what code and data should be in resident versus pageable memory. In yet another embodiment, the determination of that subset of code that is accessed frequently can be dynamically learnt and then retained in the embedded processor's memory all the time and not get swapped out to secondary memory. Accordingly, embodiments can identify the power cost of page faults and of transfer of a faulted page for a given system, and can adjust the footprint of the resident image kept permanently within the WiFi system resident memory. The adjusting can be tuned so as to space out the time between page faults in order to keep this time larger than the minimum amount of time needed to reclaim the energy consumed by the page faults/transitions.

Figure 3:
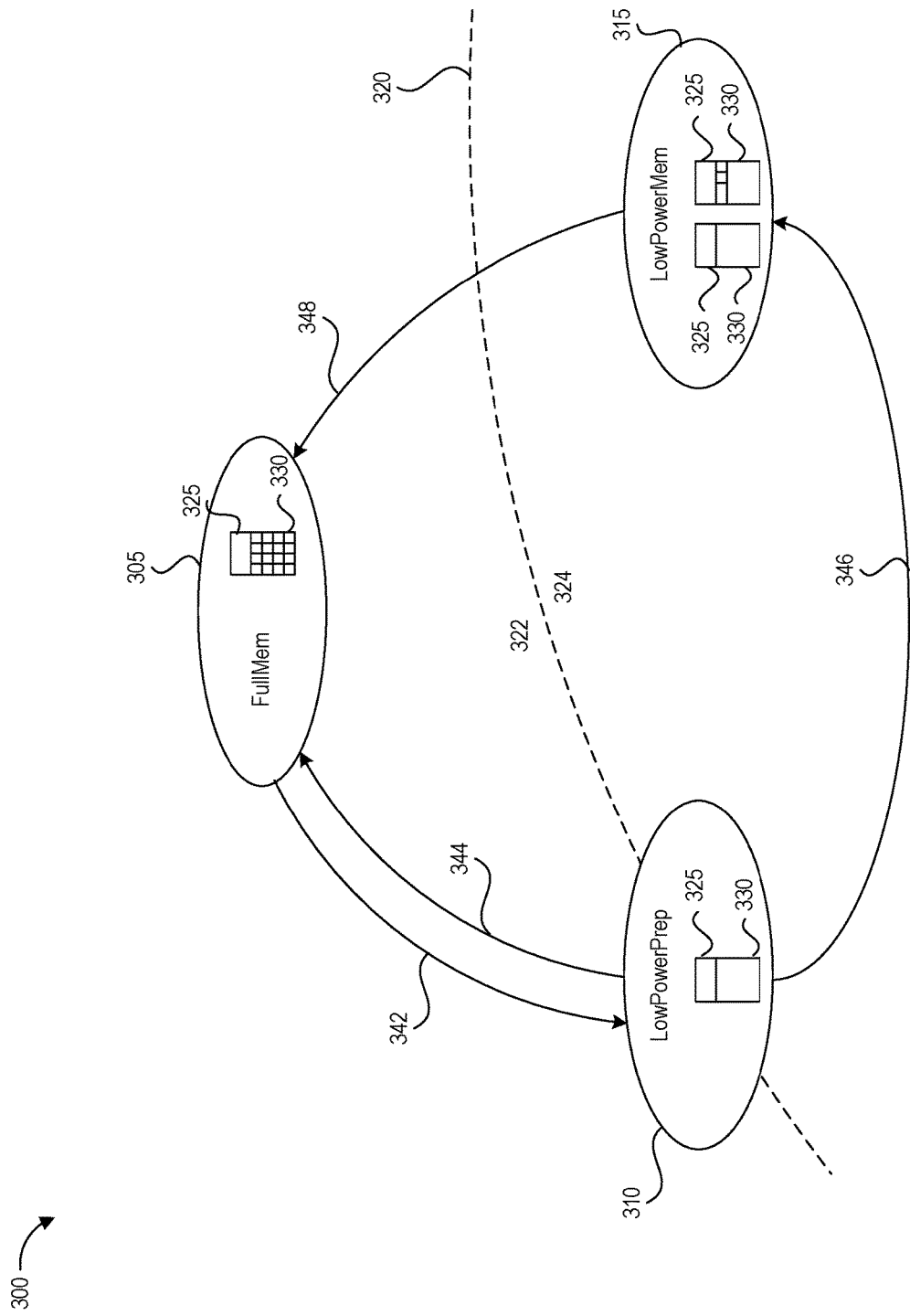
FIG. 3 illustrates an example technique for managing pages within a WiFi embedded processor memory in different power modes.

Aspects can distinguish between active versus standby modes for managing the pageable memory. For example, in active mode the WiFi system can keep pages that are currently not being used present within the embedded processor's memory during active mode, to the extent that the embedded processor's memory has room for the temporarily-unused pages. During standby mode the WiFi system can track which pages are not being accessed, remove these unaccessed pages from the embedded pageable memory, and power down the memory banks that are thus vacated. For example, FIG. 3 illustrates how pages within the WiFi embedded processor's memory are managed differently in active ("FullMem") state versus standby ("LowPowerMem") state. Aspects can determine whether to operate in active versus standby mode based in part on Wake-on-Wireless (WoW) notifications from the host/apps processor, which informs the embedded processor when the host processor is starting and stopping power-save sleeping. WoW as used herein refers to a mode wherein the host processor sleeps for an extended period whilst the WiFi system autonomously processes any background traffic. For example the host device power consumption can be significant, and so when the host device processor is active the disclosed WiFi system may not perform the disclosed power saving techniques. Some embodiments can determine whether to operate in active versus standby mode based in part on the presence or absence of a direct connection to a peer WiFi client.

Aspects can select the inactivity time limit that causes an unaccessed page to be evicted from the embedded processor's memory based on the cost of fetching a page from secondary memory. As such, in systems where the cost is low for fetching pages from secondary memory, unused pages can be aggressively evicted from the embedded processor's memory. In systems where the cost of fetching pages from secondary memory is high, unused pages can be maintained within the embedded processor's memory for a longer period following their last use. A goal of the memory low power algorithm can be to ensure that the energy expended in the page fetching spike is at least reclaimed by remaining in shut down bank configuration (where one or more pageable memory banks are powered down) for long enough that the power savings match the expended page fetching energy. As will be appreciated, it will be preferable to remain in the shut down bank configuration much longer such that greater savings are seen.

Aspects can provide alternative or additional power savings via a mechanism within the system that enables the embedded processor to fetch a page from the secondary memory (within the host system) without requiring intervention from a host processor that is currently sleeping. Considering an example system where the WiFi system and host system are coupled via a peripheral component interchange express (PCIe) bus, this can be accomplished in some embodiments by providing a bus master in addition to the host processor, for example another processor within the host system that consumes less power for operation than does the host processor. The bus master is a single entity typically. In one preferred embodiment, this technology suggests multiple bus masters in the host platform that are operating on the bus non-concurrently with appropriate handshake signals between them about ownership rules. In another embodiment, the second bus master can be a lower powered processor; in yet another embodiment, the second bus master can be realized entirely with hardware state machines requiring no processor or software support. In some embodiments, this can be accomplished by keeping the PCIe bus from going into a low-power state that would require the bus master's intervention to resume bus activity.

One or both directions of the PCIe link can be operated in a number of different power states. Power state L0 is a full operation state, power state L2 is a low power sleep state, the L3 state is a link off state, and the electrical idle or standby (L1, L1$ss$, or L0$s$) state is an intermediate state that is not actively transferring data but can enter the L0 state with less latency than the L2 state. In the L0 state, the link is fully active in its ready mode and consumes the maximum active power. During short intervals of logical idle in absence of link activities, the link may transition into an L0$s$ state with very low exit latencies (several hundred nanoseconds) for a small power reduction. In the idle/standby (L1, L1$ss$, or L0$s$) states, reference clock components are fully active except as permitted by the clock power management (using CLKREQ#). Depending on the number of optional active devices in L1 state, power savings in the idle/standby mode can be limited. The exit latencies from the idle/standby state could be in the order of microseconds under certain conditions. In L2 sleep state, the serial bus clock is reduced or even stopped and main power supplies are turned off, providing the highest idle state power savings. However, exit latencies can be very long (in the order of milliseconds) under certain conditions.

To enter the L2 state, the SOC can first request permission from the host system to enter the deeper power conservation state. Upon acknowledgement, both the SOC and host system will turn off their transmitters and enter electrical idle. Returning from L2 can require that both the SOC and host system go through the link recovery process. Typically, such communications requires the PCIe link to communicate with the power hungry host processor, which requires that this processor be woken if it is in a sleep state.

Aspects can provide an alternate route to PCIe link state transition from L2 (low power sleep state) to L0 (full operation state) for end-point access to DDR (Double Data Rate—herein used to identify the off-chip memory accessible to the WiFi SOC over the PCIe bus) without requiring host processor intervention and lighting up (powering on) the system fabric. This alternate route can provide for automatic collapse back to platform retention state and PCIe-L2 with configurable HW timeouts. Some embodiments can provide the alternate route whereby the platform suspend is tied to PCIe L1$ss$ state (a PCIe link state which is not transferring data but which can relatively quickly resume normal operation) instead of L2 state.

Some embodiments can provide the alternate route whereby the L1$ss$ clock request signal (CLKREQ) can be toggled to throw an interrupt directly to platform power monitoring circuits to bring up the platform from retention and stabilize clocks and fabric for the resources to be accessed by a bus endpoint. In such embodiments, the PCIe communication bus has a direct vote into the host platform's power manager, enabling the PCIe bus to reach into the host system memory without waking the host processor.

Some embodiments can provide the alternate route whereby L1$ss$ CLKREQ can be routed as an interrupt to a lower power processor of the host system (instead of the host system's main application processor). This lower power processor can run a proxy PCIe root-complex driver to bring the PCIe into its L0 state and stabilize fabric clocks. Furthermore, the minimal PCIe root-complex driver in the low power processor would bring the system back to retention and PCIe back into L1$ss$. This secondary master (lower power processor) will also result in handing off the ownership of the PCIE bridge to the primary master (main application processor) should there be a wakeup of the latter while the former is in the process of owning the bus Aspects can utilize the embedded WiFi processor itself for transferring pages of code or data between its own memory and the secondary memory, relying on one or more HW DMA engines (also referred to as "copy engines"), or relying on another processor core to perform the transfers.

Some embodiments can use uniform memory bank sizes, where the memory bank size can be selected to optimize compromise between minimizing the number of memory banks and the power circuitry required for the banks, versus minimizing memory by allowing granular control of how much memory is powered on. Some embodiments can use non-uniform memory bank sizes, including utilizing small memory banks to hold the initial and/or final portions of different logical contents of the embedded processor's memory, thereby minimizing the power wasted by memory that goes unutilized, due to padding to alignment constraints.

Some embodiments can use pages of a uniform specific size, where the page size is selected to best compromise between fetching only the code or data that the embedded processor actually requires, versus minimizing the amount of power spent transferring pages between secondary memory and the embedded processor's memory. Some embodiments can use non-uniform page sizes.

Aspects can fetch code or data pages only when they are accessed, or pre-fetch code or data pages that are expected to be accessed within the near future. One embodiment of a pre-fetching mechanism includes static identification of which pages are likely to be accessed in the near future. Another embodiment of a pre-fetching mechanism utilizes dynamic learning to infer which pages are likely to be accessed in the near future. A third embodiment of a pre-fetching mechanism utilizes a hybrid combination of static identification of pages likely to be accessed in the near future, and augmenting or superseding dynamic identification of which pages are likely to be accessed in the near future.

Aspects can evict inactive pages individually, when the time since last use for each page surpasses the inactivity time limit, or simply marking such pages as evictable, and waiting until all other pages within the same memory bank also become evictable and then evicting all the memory bank's pages together.

Aspects can use different methods of selecting which page frames within the WiFi embedded processor's memory to use to store a newly-fetched page, including selecting unoccupied page frames within memory banks that are already powered on, selecting inactive pages within memory banks that are already powered on, and selecting page frames from memory banks that are currently powered off. When selecting an inactive page to replace with a new page, different methods can identify which inactive page is most suitable, including considering the time since last activity for the page, whether the page contains code or data, and if the page contains data whether the data has been modified since the page was fetched into the WiFi embedded processor's memory.

Aspects can use different inactivity timeouts for different types of pages. In one embodiment, this would include utilizing a different inactivity time limit for dirty data pages versus clean data pages.

As used herein, a system on chip (SOC) refers to an integrated circuit (also known as an "IC") that integrates or embeds the components of the system into a single substrate. The substrate of the SOC refers to a thin, planar wafer of material (e.g., silicon, silicon dioxide, aluminum oxide, sapphire, germanium, gallium arsenide (GaAs), an alloy of silicon and germanium, or indium phosphide (InP)) that serves as the foundation upon which electronic components of the SOC (e.g., transistors, diodes, electronic circuits) are deposited. The substrate can be a semiconductor material. Thus, a SOC includes a single substrate provided with electronic components that form the memory and processing components of the SOC as described in more detail below. As such, the memory and processing components of the SOC are referred to as "embedded" in the chip of the SOC.

Though disclosed primarily within the context of a WiFi system operating in a low power or sleep mode, it will be appreciated that the disclosed power-optimization demand paging can be implemented to achieve power savings in other kinds of electronic systems, for example other SOC systems, and in systems operating in normal mode, sleep mode, or another mode.

Overview of Example Network Environment

FIG. 1 shows an exemplary wireless communication system 100 in which aspects of the present disclosure may be employed. The wireless communication system 100 may operate pursuant to a wireless standard, for example the 802.11ah standard.

In some implementations, a WLAN includes various devices which are the components that access the wireless network. For example, there may be two types of devices: an access point ("APs") 104 which communicates with clients (also referred to as stations, or "STAs") 106. The AP 104 and STAs 106 may transmit/receive information between each other. Further, devices that are not actively transmitting/receiving information in the wireless network may enter a sleep state to conserve power, where the devices do not actively transmit/receive information in the sleep state. These devices may further utilize the disclosed systems and techniques for minimizing memory power consumption in the sleep state.

An AP may comprise, be implemented as or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver or some other terminology. The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

STAs 106 may include, for example, a laptop computer 106c, a television 106b, a wireless device 106d, and a mobile communication device 106a. The systems and methods disclosed herein may be applied to a variety of STAs including voice recorders, video cameras, audio players (e.g., Moving Picture Experts Group-1 (MPEG-1) or MPEG-2 Audio Layer 3 (MP3) players), video players, audio recorders, desktop computers, laptop computers, personal digital assistants (PDAs), gaming systems, etc. One kind of electronic device is a communication device, which may communicate with another device. Examples of communication devices include telephones, laptop computers, desktop computers, cellular phones, smartphones, wireless or wired modems, e-readers, tablet devices, gaming systems, cellular telephone base stations or nodes, access points, wireless gateways and wireless routers, etc. In some configurations, the systems and methods disclosed herein may be applied to a communication device that communicates with another device using a satellite.

An STA may also comprise, be implemented as or known as an access terminal ("AT"), a subscriber station, a subscriber unit, a mobile station, a remote station, a remote terminal, a user terminal, a user agent, a user device, user equipment or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device or a satellite radio), a gaming device or system, a global positioning system device or any other suitable device that is configured to communicate via a wireless medium.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

The devices in a WLAN as described herein may operate in accordance with certain industry standards, such as International Telecommunication Union (ITU) standards and/or Institute of Electrical and Electronics Engineers (IEEE) standards (e.g., Wi-Fi standards such as 802.11a, 802.11b, 802.11g, 802.11n and/or 802.11ac). Other examples of standards that a communication device may comply with include IEEE 802.16 (e.g., Worldwide Interoperability for Microwave Access or "WiMAX"), Third Generation Partnership Project (3GPP), 3GPP Long Term Evolution (LTE), Global System for Mobile Telecommunications (GSM) and others (where a communication device may be referred to as a User Equipment (UE), Node B, evolved Node B (eNB), mobile device, mobile station, subscriber station, remote station, access point, station, access terminal, mobile terminal, terminal, user terminal, subscriber unit, etc., for example). While some of the systems and methods disclosed herein may be described in terms of one or more standards, this should not limit the scope of the disclosure, as the systems and methods may be applicable to many systems and/or standards. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications or other schemes. Implementations of the 802.11ah protocol may be used for sensors, metering and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

Overview of Example Memory Power Reduction Systems and Techniques

Figure 2:
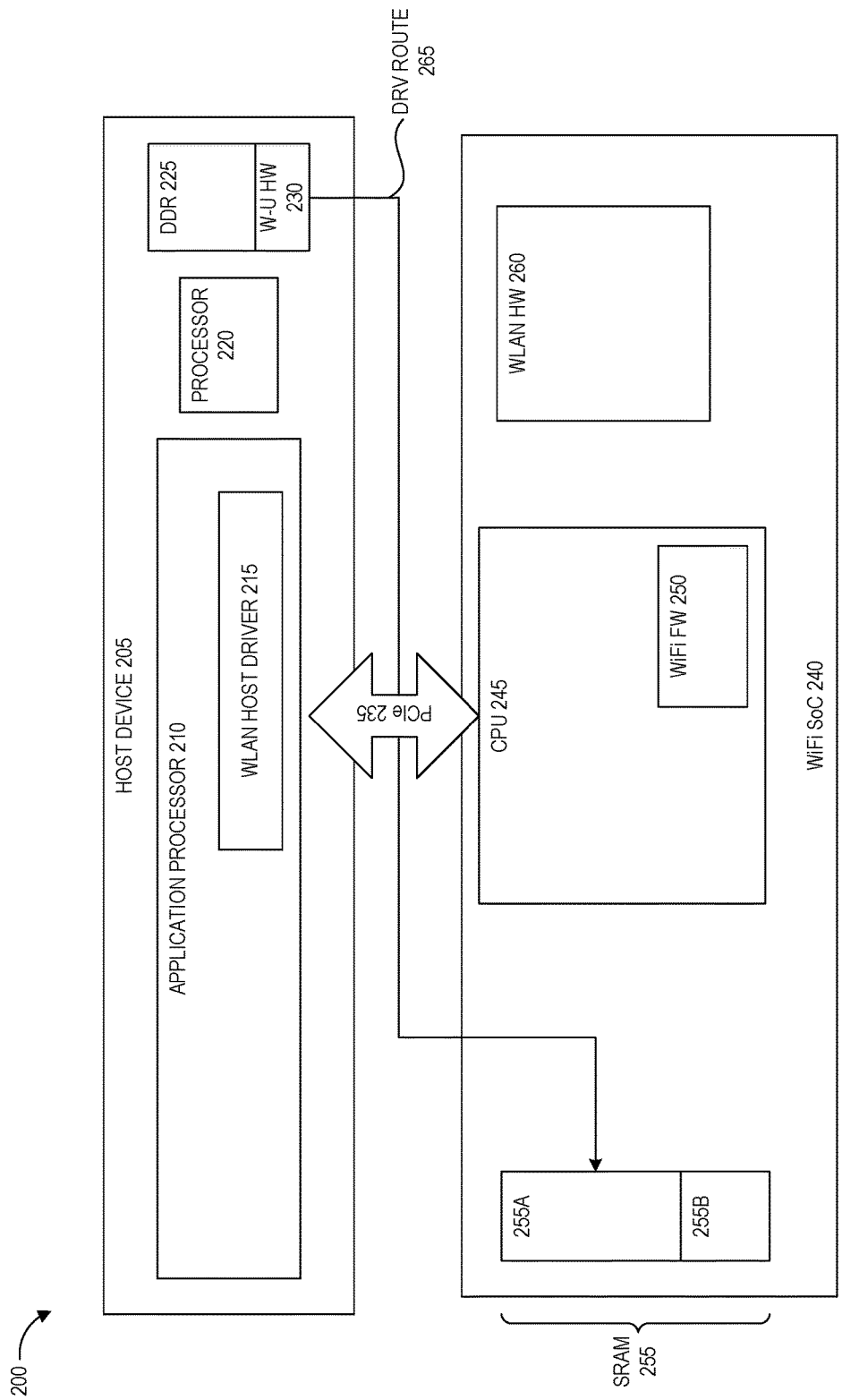
FIG. 2 depicts a high level schematic block diagram of a memory power minimization architecture as described herein.

FIG. 2 depicts a high level schematic block diagram of a memory power minimization architecture 200 as described herein. FIG. 2 shows a WiFi SOC 240 attached to a host device platform 205 via PCIe link 235. Although described in the example context of a WiFi SOC 240, the hardware, software, and firmware described with respect to WiFi SOC 240 can be implemented in other types of systems on chip.

The memory power minimization architecture 200 can be integrated into a larger computing system, device, or appliance in. For example, memory power minimization architecture 200 can be integrated into a smartphone, tablet, or laptop computer, a smart accessory such as a watch, glasses, or fitness tracking jewelry, or an Internet of Things ("IoT") device such as home appliances. Beneficially, incorporating the disclosed power-optimized WiFi SOC 240 into an IoT appliance can enable such appliances to meet international standards for energy efficiency.

WiFi SOC 240 can be an integrated low power wireless chip including on-chip (also referred to herein as embedded) WLAN hardware 260, Static Random Access Memory (SRAM) 255, and a central processing unit (CPU) 245. WiFi SOC 240 can be configured to operate in a normal mode and a low power mode as described herein. The WLAN hardware 260 can include hardware for enabling wireless communications, which in some embodiments can include a baseband and wireless transceiver, for example an 802.11b radio. The CPU 245 can include one or more processors configured by instructions stored in a WiFi Firmware (FW) memory 250 to implement the WiFi system power saving techniques described herein, among other processes. CPU 245 can operate together with or autonomously from the application processor 210. WiFi FW memory 250 can include, for example, an operating system programmed to control operations of the WiFi SOC 240. Some embodiments of WiFi SOC 240 can include additional on-chip flash memory and/or applications processors in some examples.

SRAM 255 can include a pageable memory 255A and a resident memory 255B. In some implementations SRAM 255 can include a number of different memory banks of the same or varying sizes, for example 15 banks of 256 kB each, according to some embodiments. In one example, the resident memory 255B can include 4-5 banks (~1-1.5 MB of memory), while the pageable memory 255 can include 5-6 banks (~1.5-2 MB of memory) that can be powered down as needed.

Figure 4:
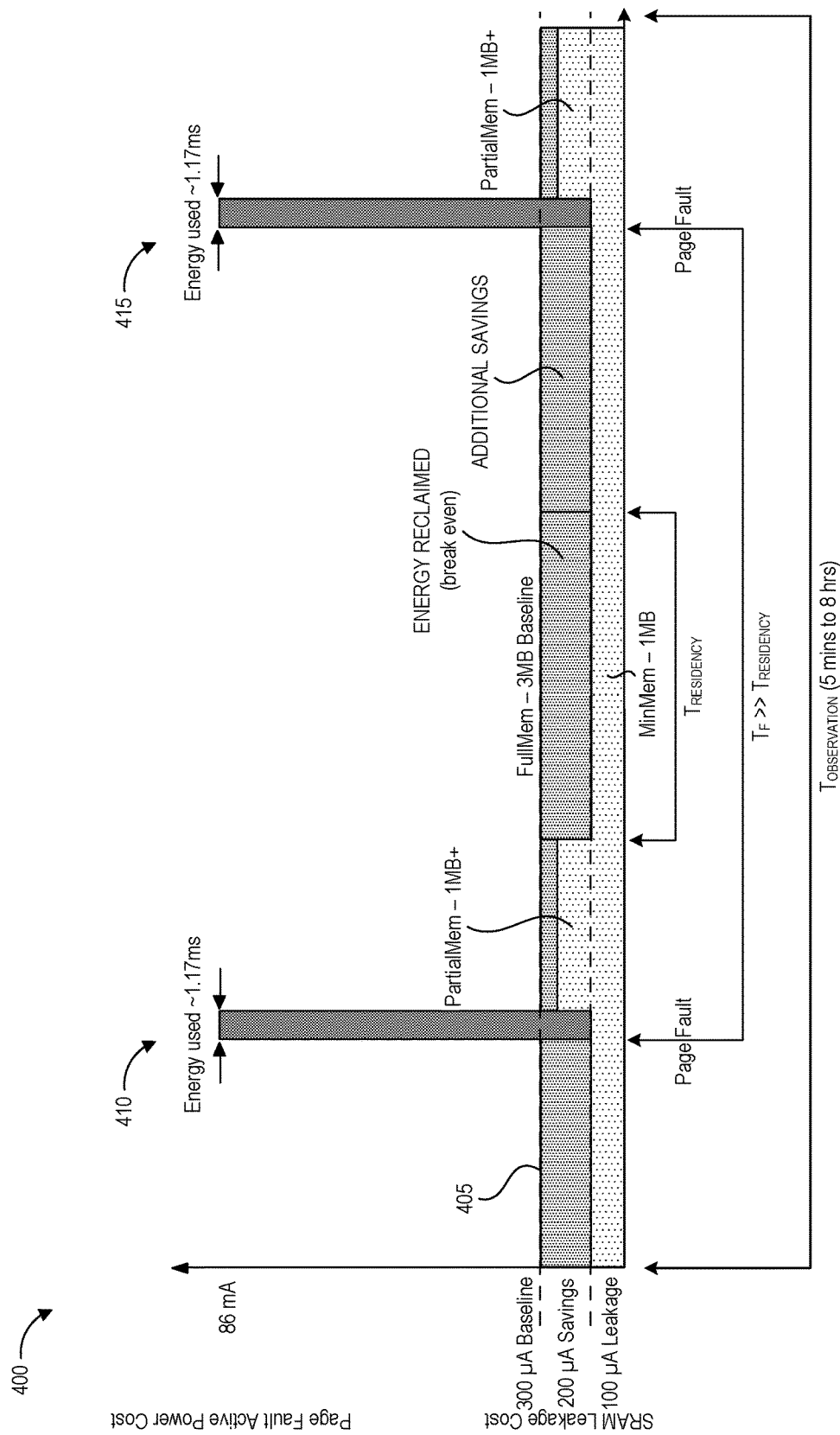
FIG. 4 illustrates example memory power costs during page fault conditions.

PCIe link 235 can be a high-speed serial computer expansion bus. Other suitable communications buses and data transfer connections can be used in other embodiments. Typically, when a PCIe link goes into a low power mode, it requires software intervention from application processor 210 to re-establish the link between WiFi SOC 240 and host device 205. This can cause a large spike in power consumption due to waking the host processor, as illustrated in FIG. 4. Accordingly, some aspects of the WiFi SOC 240 can be configured to minimize the power spikes associated with usage of PCIe link 235 during low power modes.

Host device 205 can include application processor 210, which can be the primary processor of host device 205. Application processor 210 can be configured to communicate with WiFi SOC 240 and an AP of a WLAN in some examples by WLAN host driver 215 instructions stored in a memory. Some embodiments of host device 205 may optionally include an additional processor 220 that consumes less power than application processor 210 during operation. Host device 205 can also include a memory having a DDR memory 225 and wake-up HW 230. The DDR memory 225 can be a synchronous dynamic random-access memory (SDRAM) memory that implements double data rate (DDR). SDRAM is a type of random-access memory that stores each bit of data in a separate capacitor within an integrated circuit. The capacitor can be either charged or discharged; these two states are taken to represent the two values of a bit, conventionally called 0 and 1. Since even "nonconducting" transistors leak a small amount, the capacitors will slowly discharge and the stored information eventually fades unless the capacitor charge is refreshed periodically. Because of this refresh requirement, SDRAM is a dynamic memory as opposed to static random-access memory (SRAM) and other static types of memory. SDRAM is volatile memory (vs. non-volatile memory) because it loses its data when power is removed, though it does exhibit limited data remanence. As such, though not illustrated the host device 205 can include a non-volatile memory to which certain pages can be transferred (from DDR 225 and/or SRAM 255) when the device of architecture 200 is powered down.

The wake-up HW 230 can be a read-only memory storing permanent software instructions, and can be considered as a power management unit of the host device 205 that controls the operational mode of (and accordingly the amount of power provided to) the processor 220. As described herein, host device 205 can be configured to operate in a normal mode and a low power mode in which at least the application processor 210 enters a sleep mode.

As described above, certain data and code, for which access is needed frequently and/or without delay for operation of the WiFi system, can be identified and committed to long-term storage in the resident memory 255B. The resident memory 255B can remain powered on even during a sleep mode of the WiFi SOC 240. Examples of resident code and data include (1) code and data that by nature must be present on-chip, such as the code and data that manage the paging must be resident on-chip; (2) code and data that are latency intolerant, specifically code and data that cannot afford the possible latency of a page fault (if it were pageable rather than resident) and/or data that cannot afford the possible latency of a PCIe read (if it were remote rather than resident); and (3) code and data that are frequently used during WoW mode. As described above, in WoW mode the host device can enter a low-power mode and the WiFi SOC can operate autonomously to manage WLAN interactions.

Other data and code (e.g., pages), for which access is needed intermittently and/or with permissible delay, can be identified stored in the DDR 225 and fetched for temporary storage in a portion of pageable memory 255A. In accordance with the power-optimization demand paging scheme, the duration of the temporary storage can be for a time during which the page is used by the WiFi SoC, after which the page can be evicted from pageable memory 255A. Unused portions of pageable memory 255A can be powered down as described herein to achieve power savings.

Full RAM retention in WoW (aka "APPS Suspended State") impacts the overall DTIM KPI—especially the higher order DTIM. The offloaded feature needs remain the same, if not more, in WoW mode. The architecture of FIG. 2 can select RAM shut-off in WoW mode of unused "CODE" and "DATA" segments. The system can page fault, but the goal is to have enough "CODE" and "DATA" to sustain the Low Power Memory mode such that spacing between page faults ($T_{P\_FAULT}$) is much more than the minimum residency ($T_{RESIDENCY}$) time to at least break even the cost of a page fault.

Page fetching can be accomplished via direct resource vote (DRV) route 265 representing a connection between the SRAM 255 of the WiFi SOC 240 and the DDR 225 via the PCIe link 235. As described herein, various techniques can be used for page fetching to minimize the power usage by the application processor 210.

In a first embodiment, the WiFi SOC 240 can be configured to reduce the cost of a page fault via peripheral component interconnect express direct resource vote (PCIe-DRV), a mechanism by which the WiFi SOC can reach out to DDR 225 without waking up the application processor 210. PCIe-DRV can serve as a direct resource voting to the power management block of the host device 205 for fabric/DDR access and automatic return to Vdd-minimization/XO-ShutDown of the platform.

There are several considerations for SRAM reduction as described herein. There is no such firmware mode as "DTIM mode", from an APPS/HLOS (High Level Operating System) standpoint. HLOS offloads a set of features for which it expects no wakeups. Thus the FW needs to be packed with at least as much amount of code (and associated data) to sustain a DTIM mode and various offloaded features that ensures the APPS/HLOS can remain in suspended state. Retaining a minimal amount of SRAM in DTIM mode, for example 1 MB, can be key to hitting the lowering leakage in DTIM mode. SW content in the 1 MB can be be chosen in a way to minimize Page Faults during (1) DTIM Power Key Performance Indicator (KPI) observation window (e.g, 1-10 minutes, typically) and (2) Days of Use Metrics (e.g., 4-8 hours, typically). DoU refers to the regular end-user usage of the device across standby/dtim mode and active modes, e.g., web-page browsing, video playback etc. Any page fault will cause platform wake-up to reach DDR—energy expended with each such wakeup is preferably compensated, at the least, for by equivalent savings during that observation window. Multiple page faults within an observation window without equivalent savings will not only impact DTIM Power KPI but also DoU metrics. Silent and light-weight handling of page fault can be essential to the overall DTIM and DoU power metric. To this end, involving Host/APPS for PCIE link restore may not be a workable solution, as it can lead to massive power impact and functional failure, such as HLOS/APPS wakeup for features that were supposed to have been offloaded to the WiFi SoC.

Accordingly, the disclosed memory power saving techniques include a demand paging framework in SW and a PCIE-DRV option to route to DDR without host involvement. Three options: (1) PCIe-DRV, (2) low power processor assisted, and (3) HLOS/Apps SW-Assisted are described in more detail below.

A first page fetching option, PCIE-DRV, can allow the WiFi SOC to establish a direct hardware to hardware connection for transferring data from secondary storage to embedded storage without waking or involving any sleeping host processors. For example, PCIE-DRV can allow the WiFi SOC to operate out of lower memory footprint (e.g., 1 MB) retained SRAM in DTIM mode while being able to cater to a vast array of Protocol/Feature offloads from HLOS standpoint. In one embodiment, offloads can include one or more of ARP, NS, IPV6/RA, NAT-KA, Google-Scan, PNO Scan, NLO Scan, Ranging Offload, Roaming Offload, GTK-Offload, Android Packet Filter Offload, NAN Offload, and 802.11ax Broadcast-TWT offload, to name a few examples. A majority of these offloads can kick in in 20-30 s interval, some of them are HLOS configured (1 min to 5 min) while some are greater than five minutes. PCIE/CLKREQ acts as a direct vote into the resource power manager (RPM), and no host application processor is involved. After wakeup, pages are fetched in from DDR and once done the disclosed WiFi SOC removes DRV. The RPM transitions into XO-SD and Vdd-minimization state for the platform. This can provide the fastest, silent and most power efficient way to achieve the DTIM and DoU KPIs.

A second page fetching option, low power processor assisted page fetching, can call a secondary processor of the host device (that consumes less power than the primary applications processor) as a proxy for waking a standby PCIe link. For example PCIE-CLKREQ interrupt can be routed to a secondary processor resulting in wakeup of the secondary processor and turning on of PCIE into L0. This can include no primary host processor (APPS) involvement. The secondary processor can act as a proxy to shutdown XO (i.e., XO-SD state) and allow VDDmin of the platform. Advantageously low power processor assisted page fetching requires minimal hardware changes, however this approach can carry a very high SW effort and/or risk.

A third page fetching option, as shown in FIG. 4, is APPS/HLOS SW-Assisted. Using APPS/HLOS SW-Assisted page fetching, a PCIE-WAKE# can be routed to APPS and PCIe link restored to L0. HLOS Resume happens (the high level operating system exits standby mode and resumes operation). Re-entry into suspend HLOS can be controlled, and it can be active for a longest time of around 2 seconds in some examples. This can be a least desirable option in some embodiments due to high $T_{RESIDENCY}$ caused by HLOS Suspend timeouts (>1 s, in most HLOS).

There are different possible degrees of "frequently used" that can be used to classify code or data as resident. Different implementations can use different definitions of how much code+data should be resident versus how much should be paged in only when needed. In general, the tradeoff between resident vs. pageable depends on the power cost of fetching a page of memory into SRAM temporarily (from the PCIe bus and possibly the host processor), versus the power cost of permanently storing the code+data in SRAM (due to the leakage current during retention of the extra SRAM). This tradeoff depends in part on whether the target can access the PCIe bus without waking the host processor. In "PCIe Direct Resource Vote" (a.k.a. PCIe-DRV) systems, this is possible, while in non PCIe-DRV systems a PCIe bus access can wake the host processor. Some WiFi SOC products will have PCIe-DRV, while others will not. WiFi SOC 240 PCIe-DRV systems can conserve power by using a more exclusive definition of low power memory mode (MinMem) code+ data. WiFi SOC 240 non PCIe-DRV systems will need to offset the larger power cost of page faults by using a more inclusive definition of MinMem code+data, to reduce the frequency of page faults.

In an example of a PCIe-DRV version of WiFi SOC 240, the code and data for processing WLAN events that occur within roughly every 60 seconds will be part of MinMem's resident memory. In one example of a non PCIe-DRV version of WiFi SOC 240, the code and data for processing WLAN events that occur within roughly every 4 minutes will be part of MinMem's resident memory.

In some embodiments, identification of which WLAN code+data is used with what periodicity can be done via analysis of ETM tracing during WoW mode. ETM, which refers to Embedded Trace Macrocell, is an instruction trace via dedicated trace pins. ETM records a program's execution instruction-by-instruction (a "trace"). The trace indicates where code has been stored in a system, how it got there, and for how long it has been there. ETM can be useful for code coverage analysis and software profiling, among other things. In some embodiments the WiFi SOC 240 can be equipped with an analytics engine, for example incorporating machine learning techniques, that can log code and data access and usage, identify trends, and intelligently manage resident and pageable memory based on the identified trends to optimize power savings. The former technique relies on static configuration whereas the latter, on runtime adaptation.

In addition to managing the resident and pageable memory and turning off unused pageable memory, some embodiments can achieve additional power savings by minimizing the number of threads, for example from 13 to 5. Such embodiments can include a mechanism for conditionally compiling code to handle to or more sets of signals either within a single thread or in separate threads. Any resulting reduction in potential parallelism can affect performance, however such impacts to performance can be negligible in comparison to the power savings. Yet another embodiment can be dynamic addition and deletion of software threads so as to release memory associated with threads that are not planning to be triggered in memory low power mode. As an example, one can give up on threads that are relevant only in performance modes that rely heavily on the platform/HLOS being active.

Some embodiments can achieve additional power savings by minimizing per-thread memory. For example, the stack size for each thread can be tailored to that thread's requirements rather than using the same worst-case stack size for all threads, and the thread's message FIFOs can be similarly tailored to the size required by that specific thread, and thus the memory consumption for a given thread can be substantially reduced from 14 KB in some examples.

Some embodiments can achieve additional power savings by powering off the unused MAC instance during LowPowerMem state. Such techniques can be used in products that employ a dual-mac simultaneous mode where data structures of the second mac are irrelevant to the low power memory mode.

Some embodiments can achieve additional power savings by allowing infrastructure software (e.g., BSP) buffers that are not needed during LowPowerMem to be paged out.

Several tens of KB can be released that are not applicable to LowPowerMem state, such as RCINIT buffers and a large diagnostic buffer which are primarily used when the platform/HLOS is active.

Some embodiments can achieve additional power savings by allocating a small number of local frame rx buffers in resident memory; allocate the remainder in "collapsible" pageable memory. For example, WiFi SOC 240 can keep a few rx buffers necessary for receiving a small number of beacon frames, management frames, and single data frames within resident memory, and can allocate the remainder of local rx buffers in collapsible memory, where it will not count against the MinMem size. Some embodiments can achieve additional power savings by moving portions of WLAN scan event handler objects that are accessed during every beacon rx, even if scan is not in progress, into separate objects. This can save several KBs of memory in some examples by not requiring the whole WLAN scan event handler allocation to be included in MinMem.

FIG. 3 illustrates an example cycle 300 for managing pages within a WiFi embedded processor memory in different power modes. For example, FIG. 3 illustrates how pages within the WiFi embedded processor's memory are managed differently in active power mode 305 (FullMem) state versus standby/low power mode 315 (LowPowerMem), and also illustrates the preparatory mode 310 (LowPowerPrep) when entering low power mode 315 from active power mode 305.

Arrow 342 represents the embedded processor transitioning the memory from active power mode 305 into preparatory mode 310. This can be responsive, for example, to a WOW START command, and can involve flushing the L2 cache, evicting pages from the pageable memory 330, and configuring of a diagnostic tool (e.g., a wdiag tool) to store information locally on the SOC, for example in a circular buffer, rather than uploading the diagnostic information to the host processor.

Arrow 344 represents the embedded processor transitioning the memory from preparatory mode 310 into active power mode 305. This can be responsive, for example, to a WOW_STOP command, and can involve configuring of a diagnostic tool (e.g., a wdiag tool) to upload diagnostic information to the host processor rather than storing it locally.

Arrow 346 represents the embedded processor transitioning the memory from preparatory mode 310 into low power mode 315. This can be involving enabling SRAM power collapse and page inactivity eviction, as well as software delivery traffic indication message (SW DTIM) entries from a wireless station virtual devices (STA vdev).

Arrow 348 represents the embedded processor transitioning the memory from low power mode 315 into active power mode 305. This can be responsive, for example, to a WOW_STOP command, and can involve disabling SRAM power collapse and page inactivity eviction and configuring of a diagnostic tool (e.g., a wdiag tool) to upload diagnostic information to the host processor rather than storing it locally.

Dashed line 320 in FIG. 3 represents a division between operations that occur when a high level operating system (HLOS) of the host device is running (portion of FIG. 3 above line 320), for example when application processor 210 is in use, and operations that occur when the HLOS is in a suspended state (portion of FIG. 3 below line 320). For operations occurring on a first side 322 of the dashed line 320 (e.g., operations occurring when HLOS is running), the PCIe link can be operating in L0 or L1SS power modes, and a cache miss can be acceptable. For operations occurring on a second side 324 of the dashed line 320 (e.g., operations occurring when HLOS is suspended), for implementations using direct resource vote (DRV) the PCIe link can be operating in L0 or L1SS power modes, and for implementations not using direct resource vote (non-DRV) the PCIe link can be operating in L0, L1SS, or L2 power modes. For these operations, a cache miss can be not acceptable.

Each mode includes at least one graphical representation of the storage and power status of resident memory 325 and pageable memory 330. In active power mode 305 the resident memory 325 and pageable memory 330 of the WiFi SOC can both be fully powered on, for example for managing active data transfer through a WLAN. Pages can be discarded from pageable memory 330 based on capacity requirements in accordance with page demand schemes.

As illustrated, in some embodiments the preparatory mode 310 can occur at the transition of the HLOS from running to suspended, as indicated by line 320. To transition from active power mode 305 to preparatory mode 310, the WiFi SOC can evict anything in the pageable memory 330, turn off the pageable memory 330, and keep resident memory 325 powered on.

In low power mode 315 the WiFi SOC can operate autonomously as the HLOS is suspended. The WiFi SOC can repower portions of the pageable memory 330 as needed for intermittently used data and/or code. When the intermittently used data and/or code is no longer being used, the WiFi SOC can evict the pages from the pageable memory 330 and again power down the portions of the pageable memory 330 that were holding the evicted pages.

As an example, code and data needed to respond to an address resolution protocol (ARP) can be temporarily kept in the pageable memory 330 in low power mode 315. The WiFi SOC can access secondary storage, for example host DDR, to obtain code that instructs the WiFi SOC how to respond to the request and data for responding to the request. A page including this code and data can be stored in pageable memory 330 while the WiFi SOC is handling the response. For example, the WiFi SOC can identify a bank of pageable memory 330 that is already powered on and has capacity for the page, or can power on a bank if no such powered-on storage is available. After response is completed, the WiFi SOC can evict the page from the pageable memory 330 and shut down the memory bank (if no other in-use instructions are currently stored in the bank).

As another example, the WiFi SOC can be configured to handle keep alive network pings in low power mode 315 to allow the HLOS to remain suspended. To illustrate, a network can send pings to see if the device of WiFi SOC is still using an address in a multiplex multiple connections within a single address. The WiFi SOC can access secondary storage to obtain code that instructs the WiFi SOC how to respond to the request and data for responding to the request. A page including this code and data can be stored in pageable memory 330 while the WiFi SOC is handling the response, and after response is completed, the WiFi SOC can evict the page from the pageable memory 330 and shut down the memory bank. If the keep alive ping is detected to exceed a threshold frequency the WiFi SOC can instead store the page in resident memory 325.

FIG. 4 illustrates a graph 400 of example memory power costs during page fault conditions. In the illustrated example, when both the WiFi SOC and host device processor are operating in low power mode, a baseline power cost can be 300 μA, as an example. When a page fault occurs, if the host processor is woken (for example to initialize a PCIe link that has gone into standby mode) to assist with data transfer between a secondary memory and the WiFi SRAM, the power cost during the page fault can be around 86 mA, as an example. The page fault can last around 1.17 ms. After waiting for a time interval $T_{RESIDENCY}$, the power savings from operating with part of the pageable memory shut down equal the energy expended for the page fault. If a time $T_F$ between page faults exceeds $T_{RESIDENCY}$, the system can execute another page fault while still conserving power. The disclosed techniques for accessing the DDR or other secondary memory without waking the host processor can significantly reduce the length of the $T_{RESIDENCY}$ interval and achieve heightened power savings compared to implementations that wake the host processor for page faults.

One aspect of the disclosed memory power saving techniques relates to selecting the inactivity time limit that causes an unaccessed page to be evicted from the embedded processor's memory based on the cost of fetching a page from secondary memory. This can be performed such that, in systems where the cost is low for fetching pages from secondary memory, unused pages are aggressively evicted from the embedded processor's memory, while in systems where the cost of fetching pages from secondary memory is high unused pages are maintained within the embedded processor's memory for a longer period following their last use.

Considering the tradeoff of $T_{RESIDENCY}$ vs. $T_{FAULT}$ helps in selection of the minimum resident code that's needed to prevent too frequent page faults (and associated power spike in fetching the code from platform memory). One goal of the memory low power algorithm can be to ensure that the energy expended in the spike is at the least reclaimed by remaining in shut down bank configuration for long enough. However, the desire is to remain in the shut down bank configuration much longer such that actual savings are seen.

In one embodiment, the analysis of $T_{residency}$ vs. $T_{fault}$ can be done statically and the resident code image can be pre-configured. In another embodiment, the analysis of $T_{residency}$ vs. $T_{fault}$ can be done dynamically. For example, the system can observe the behavior runtime and identify whether the mean time between faults ($T_{fault}$) is happening too frequently to offset the benefits of the memory low power scheme. In such embodiments, the system can change the footprint of the resident image. In yet another embodiment, such dynamic behavior can be accomplished via a learning software employing elements of machine learning. Some systems can implement combinations of two or more of these embodiments.

As can be seen in FIG. 4, the lower the spike is the better the design. Some embodiments can implement a PCIE-DRV scheme as explained below herein where the cost of the spike is significantly reduced as opposed to traditional platforms.

In some embodiments, a key tradeoff parameter can be how much of memory to retain to space out successive Page Faults in such a way that leakage energy savings compensate and overpower the energy used in the Page fetch-in process.

Equation 1 illustrates an example model of tradeoff parameters for the disclosed memory power management system.

$$T_{RESIDENCY} = \frac{(P_{APPS} + P_{SNOC} + P_{DDR} P_{PCIE\_RC} + P_{NAPALI\_MISC} + P_{PCIE\_NPR}) * T_{ACTIVE\_ON}}{P_{SRAM\_LEAKAGE\_RECLAIMED}}$$ Equation (1)

$T_{RESIDENCY}$ puts a lower bound on the minimal spacing between two successive page faults ($T_F$) such that the energy consumed at battery breaks even against the leakage savings. A zero-sum condition occurs if $T_{RESIDENCY} = T_F$. It can be detrimental to DoU power if $T_F < T_{RESIDENCY}$. Benefits can be appreciable to DTIM and DoU Power if $T_F >> T_{RESIDENCY}$, and $T_F = 10 \times T_{RESIDENCY}$ can be a preferable starting point in some embodiments. Such benefits may be noticeable when observed over a sufficiently long window ($T_{OBSERVATION}$, ranging from 5 mins to few hours).

In some embodiments, an eviction timer can be fixed for all pages. In some embodiments, the timeout can be weighted across pages to give certain pages more residency on-chip. In some embodiments each timeout can be chosen statically (per image) or can be adapted based on thrashing of pages.

LPMem state machine kicks in aligned with DTIM entry. WiFi FW can only see two modes—FullMem mode and MinMem mode—and the transitions can be managed by LPMem SM. PartialMem state can be transparent to WiFi FW and managed entirely by Board Support Package (BSP) codes. However, callback to WiFi FW can be needed. A LRU timer can be maintained for each page by periodic FW evaluation timer with fake Page Fault triggers or by HW acceleration.

Figure 5:
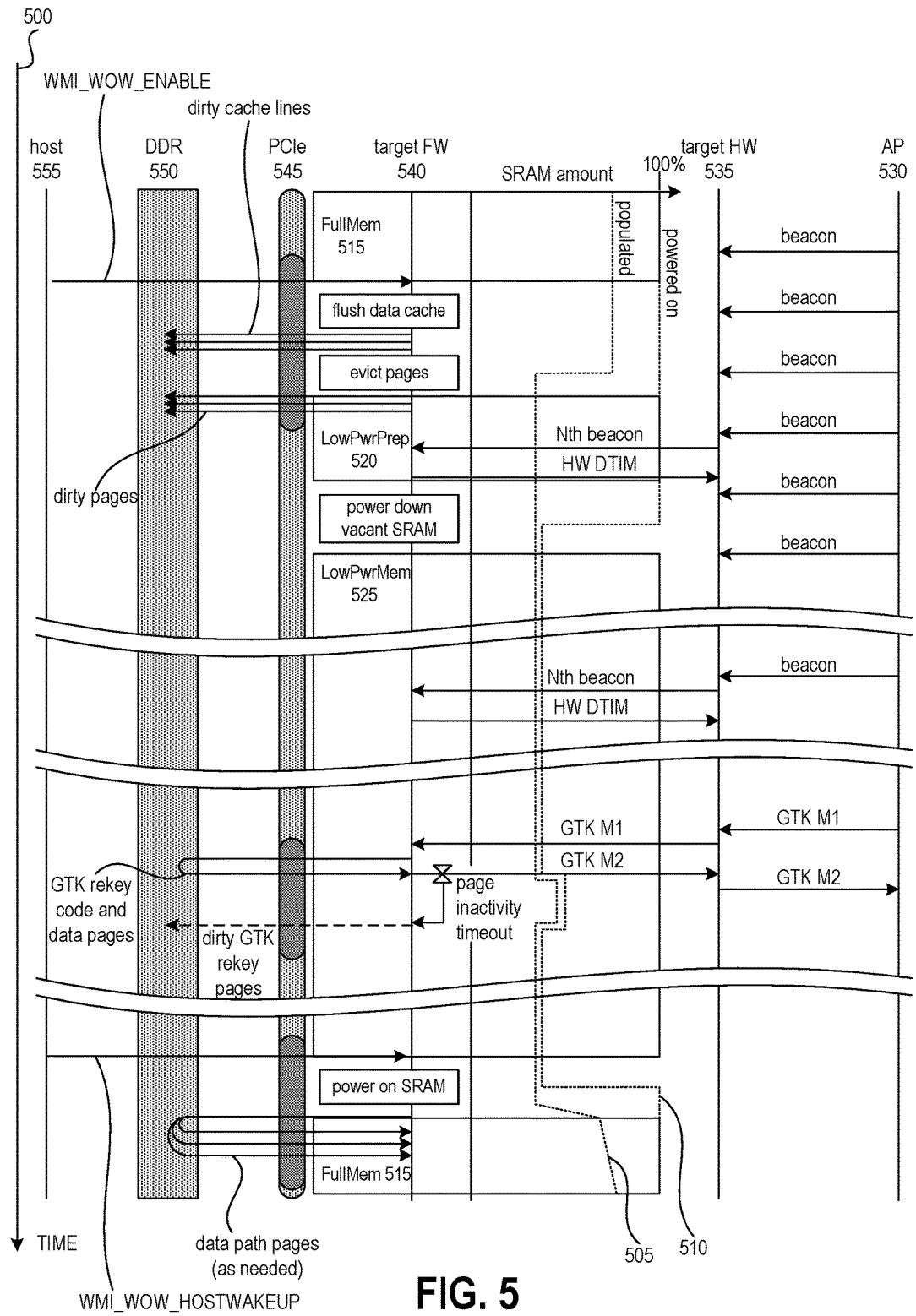
FIG. 5 is a diagram illustrating examples of network data flow in accordance with the systems and methods disclosed herein.

FIG. 5 depicts example data communications between an AP 530, WiFi HW 535, WiFi processor 540, PCIe 545, and secondary memory 550 of host 555 during an example timeline 500. The timeline 500 also illustrates how the powered-on fraction of the WiFi embedded processor's memory varies over time as the system enters standby state and processes events within the standby state.

The timeline 500 shows a first line 505 representing an amount of WiFi SOC SRAM that is populated and a second line 510 representing an amount of WiFi SOC SRAM that is powered on during each of active mode 515 (FullMem), preparatory mode 520 (LowPowerPrep), and low power mode 525 (LowPowerMem). As shown by the lines 505, 510, in the active mode 515 the SRAM is fully powered on and a significant percentage is populated. In the preparatory mode 520 the SRAM is fully powered on but much of the populated SRAM is vacated, for example by flushing the data cache and evicting pages. The power to the vacant SRAM is then shut down and the WiFi SOC enters the low power mode 525.

The timeline 500 illustrates communications between the AP 530 and WiFi SOC relating to a Group Transient Key (GTK) during the low power mode 525. As shown by the lines 505, 510, responding to this request involves a temporary increase in the amount of SRAM that is populated and powered on. After a page inactivity timeout period, the amount of populated and powered on SRAM returns to the baseline levels for low power mode 525. The amount of SRAM that remains populated and powered on in low power mode 525 can include the resident memory and any pageable memory needed for responding to requests such as the GTK M1 request.

At the bottom of the timeline the host sends a WoW wakeup signal to the WiFi SOC indicating that its HLOS and applications processor are resuming activity, for example to manage communications via the WLAN. At this point the SRAM is powered on as shown by line 510, and is gradually repopulated as shown by line 505.

Overview of Predictive Pre-Fetching and Page Use Tracking

Figure 6A:
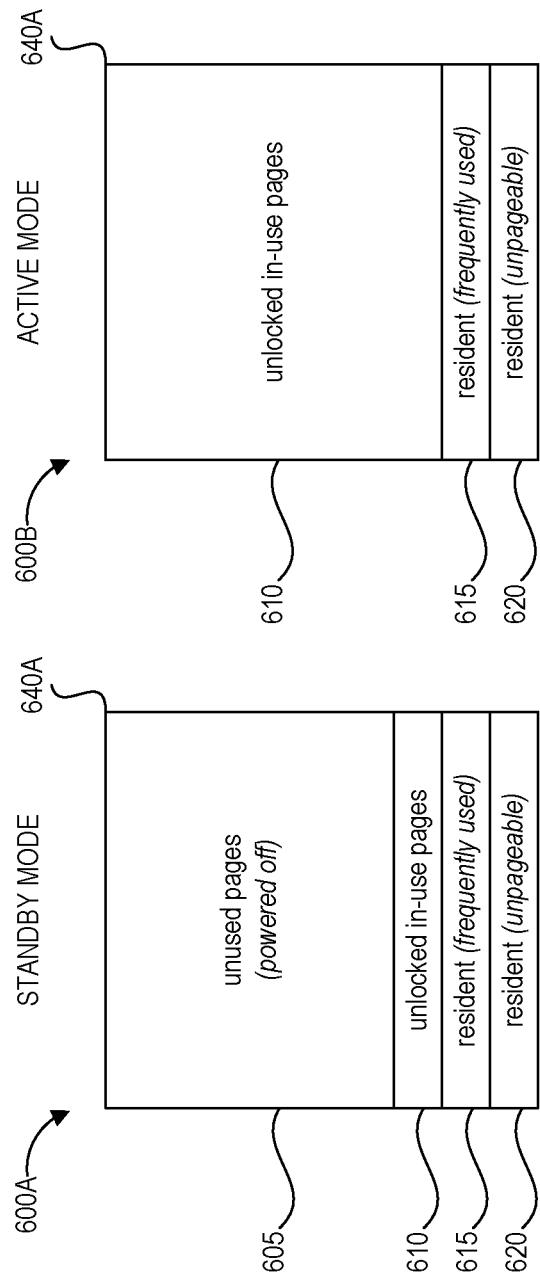
FIGS. 6A and 6B illustrate example uses of portions of a memory in standby and active modes according to the present disclosure.
Figure 6B:
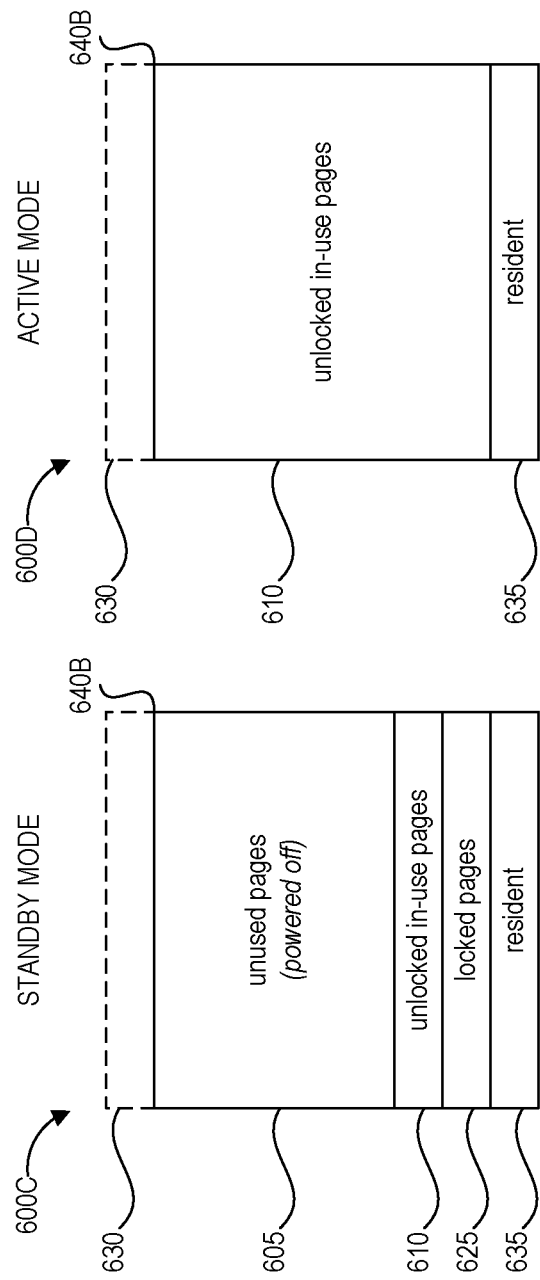

FIGS. 6A and 6B illustrate example uses of portions of a memory in standby and active modes according to the present disclosure. FIG. 6A depicts a first configuration 600A of a first embodiment of a memory 640A, for example SRAM 255 or another embedded memory of a SOC, as operated when the host processor is in standby mode. FIG.

6A also depicts a second configuration 600B of the memory when the host processor is operated in active mode.

In the first configuration 600A, the memory 640A includes a powered-off portion 605 of pageable memory that is unused for storage of pages (e.g., vacant). The powered-off portion 605 is not provided with power in the first configuration. As described above, the memory 640A can comprise SRAM. SRAM is a form of volatile storage that retains data bits in its memory as long as power is being supplied, for example using bistable latching circuitry or other suitable flip flop circuitry to store each bit. Thus, the powered-off portion 605 (and the other portions of memory 640A) may lose data when power is turned off to this portion. As described herein, portions of the powered-off portion 605 can be selectively powered on if needed to accommodate an increase in unlocked in-use pages.

The memory 640A in the first configuration 600A also includes an in-use pages portion 610, frequently used pages resident memory portion 615, and unpageable memory resident portion 620 that are powered on in the standby mode. The in-use pages portion 610 is pageable memory storing unlocked in-use pages, for example pages currently or recently in use in the standby mode that may be evicted from the local memory when not in use. The total size of the combined powered-off portion 605 and in-use pages portion 610 can be fixed, though the individual sizes of these portions 605, 610 can vary during standby mode. For example, as described herein, pages can be evicted from the in-use pages portion 610 after a predetermined amount of time, based on a LRU timeout, or periodically based on system page management rules. As pages are evicted, portions of the in-use pages portion 610 that are no longer being used to store pages can be powered down, thus increasing the size of the powered-off portion 605 and decreasing the size of the in-use pages portion 610. Conversely, as page faults occur and/or pages are predictively pre-fetched, portions of the powered-off portion 605 can be powered on to store such pages, thus increasing the size of the in-use pages portion 610 and decreasing the size of the powered-off portion 605.

The frequently used pages resident memory portion 615 and unpageable memory resident portion 620 comprise resident memory. As described herein, resident memory maintains a powered-on volatile memory that stores resident pages of code or other data. Examples of resident pages include (1) pages required for operation of the memory, for example pages of code that manages the paging; (2) pages that are latency intolerant (e.g., required faster than the amount of time it would take to fetch them from the external memory); and (3) pages that are used with sufficient frequency and/or periodicity such that the amount of energy required to keep the frequently used pages resident memory portion 615 and unpageable memory resident portion 620 powered on is less than the amount of energy that would be required to fetch the pages. The frequently used pages resident memory portion 615 can be used to store pages that are frequently used by the system (e.g., a WiFi SOC), for example pages that are used to control operations of the memory 640A in standby mode. The unpageable memory resident portion 620 can be used to store pages that are non-pageable, for example kernel-level code. Though shown as separate portions, in some embodiments the frequently used pages resident memory portion 615 and unpageable memory resident portion 620 may be a single resident memory portion.

In active mode, the memory 640A can be operated according to the second configuration 600B. In the second configuration 600B, the in-use pages portion 610 that is powered on for storing unlocked (e.g., pageable and dynamically stored) pages expands into the space previously occupied by the powered-off portion 605. For example, in active mode the power reduction achieved by powering down unused portions of pageable memory may be overcome by the power costs of page faults, and thus the entire pageable memory can be powered on as shown in the second configuration 600B. The resident memory portions 615, 620 can remain the same in active mode as in standby mode discussed above. Thus, in this embodiment of the memory 640A, pages that are used so frequently during standby mode that the power cost of storing them in the memory 640A is less than the power cost of fetching them can be permanently stored in the frequently used pages resident memory portion 615.

FIG. 6B depicts a third configuration 600C of a second embodiment of the memory 640B, for example SRAM 255 or another embedded memory of a SOC, as operated when the host processor is in standby mode, as well as a fourth configuration 600D of this embodiment of the memory 640B when the host processor is operated in active mode. The memory embodiment of FIG. 6B can implement a mode-based predictive prefetching for frequently used standby pages (e.g., code and data frequently used when the host processor is operated in standby mode). Because of this, the total amount of the memory 640B can be reduced compared to the embodiment of FIG. 6A, as shown by dashed box 630 representing the volume of memory occupied by the first embodiment of the memory 640A that is not occupied by the second embodiment of the memory 640B.

In the third configuration 600C, the memory 640B includes a powered-off portion 605 of pageable memory that is unused for storage of pages (e.g., vacant). The powered-off portion 605 is not provided with power in the third configuration. As described above, the memory can be volatile storage that retains data bits in its memory as long as power is being supplied. Thus, the portion 605 may lose data when power is turned off to this portion. As illustrated, the powered-off portion 605 of the memory 640B can be smaller than the powered off portion 605 of the memory 640A by the amount of memory reduction illustrated by the dashed box 630.

In the third configuration 600C, the memory 640B includes an in-use pages portion 610, locked pages memory portion 625, and resident memory portion 635 that are powered on in the standby mode. The in-use pages portion 610 is pageable memory storing unlocked in-use pages, for example pages currently or recently in use in the standby mode that may be evicted from the local memory when not in use. As described above with respect to FIG. 6A, the total size of the combined powered-off portion 605 and in-use pages portion 610 can be fixed, though the individual sizes of these portions 605, 610 can vary during standby mode based on the number (and bit volume) of unlocked in-use pages.

The locked pages memory portion 625 is pageable memory storing a set of locked pages associated with a current operating mode. For example, upon entering standby mode, a set of standby mode pages (e.g., pages of code or data frequently used in standby mode or otherwise important to controlling standby mode operations) can be predictively pre-fetched into the locked pages memory portion 625. For example, standby mode pages can include code representing instructions for fetching and evicting the unlocked in-use pages, code representing instructions for powering on or off portions of the powered-off portion 605 and in-use pages portion 610, code representing instructions for tracking page usage, and any data used or generated in these processes. Though discussed in the example of standby mode, the locked pages memory portion 625 can be used to store other mode-specific page sets as well. Sets of mode-specific pages can be pre-determined and/or dynamically determined based on analysis of page usage data, for example using machine learning systems, as described herein with respect to FIGS. 7 and 8.

The pages that were stored in the resident memory portion 615 in the first embodiment 640A in both standby and active modes can instead be pageable in the second embodiment 640B, with such pages being pre-fetched when entering standby mode and locked in place during the duration of standby mode. Because standby mode pages can be pre-fetched and locked in the locked pages portion 625 for the duration of standby mode, these pages need not be present in local memory during active mode 600D. As such, the amount of memory reduction illustrated by the dashed box 630 can correspond to the size of the frequently used pages resident memory portion 615 of the memory 640A that is used to store frequently used standby pages even while the memory 640A is operated in active mode 600B. This reduction in local memory beneficially reduces the cost and standby power consumption of the memory 640B relative to memory 640A. Even though the same amount of local memory can be powered on during standby mode in the memory 640A and memory 640B, a lesser amount of local memory remains unused and powered off. Because the power consumption of powered-off memory is in reality non-zero, reducing the amount of unused memory reduces the standby power consumption of the memory 640B.

The resident memory portion 635 maintains a powered-on volatile memory that stores resident pages of code or other data. The resident memory portion 635 can store similar pages as the unpageable resident memory 620 described above, for example (1) pages required for operation of the memory, (2) pages that are latency intolerant, and (3) pages that are used with sufficient frequency and/or periodicity such that the amount of energy required to keep the resident memory portion 635 powered on is less than the amount of energy that would be required to fetch the pages.

In active mode, the memory 640B can be operated according to the fourth configuration 600D. In the fourth configuration 600D, the in-use pages portion 610 that is powered on for storing unlocked (e.g., pageable and dynamically stored) pages expands into the space previously occupied by the powered-off portion 605. In addition, the in-use pages portion 610 expands into the portion of the memory 640B previously occupied by the locked pages portion 625. Any mode-specific page sets can be evicted from the locked pages portion 625, for example by evicting standby mode pages upon entering active mode. The resident memory portion 635 can remain the same in active mode as in the standby mode discussed above.

It will be appreciated that a memory initially configured according to the first embodiment 640A can be modified to implement mode-based predictive prefetching as described with respect to the second embodiment 640B, though without the corresponding memory reduction illustrated by the dashed box 630.

In some embodiments, the pre-fetching described herein (dynamic and/or modal) can further involve filling any powered-on banks of pageable memory. For example, for dynamic pre-fetching the embedded processor can be configured to identify a remaining size of an already powered-on pageable memory bank or identify a total size of a powered-down pageable memory bank that will be powered on to store the next fetched pages. The embedded processor can then compare the memory size of the page fetch set (including the requested page and predicted page(s)) to the identified memory bank size. If the memory size of the page fetch set is smaller than the identified memory bank size, the embedded processor may select as many additional pages as needed to fill the identified memory bank size, for example based on other pages that have high probabilities of being requested within a threshold amount of time. For modal pre-fetching, the embedded processor can identify the set of mode-specific pages based on this set having a memory size that fills any pageable memory banks that will be powered on to store the set. As will be appreciated, "filling" a memory bank may not use every single bit available in the memory bank, but the number of unused bits should be less than the number of bits required to store an additional page (a "page frame"). However, in some scenarios there may be reasons to leave some page frames vacant or empty within a powered-on memory bank. For example, if the probability of using any further pages is small enough, it may not be worth the extra power expenditure to copy the page in question from secondary storage into the page frame of the embedded memory. In other examples the power required to fetch additional pages together with the desired pages may be trivial, so it may be worthwhile to fill the memory bank even with pages that have a low probability of use.

Figure 7:
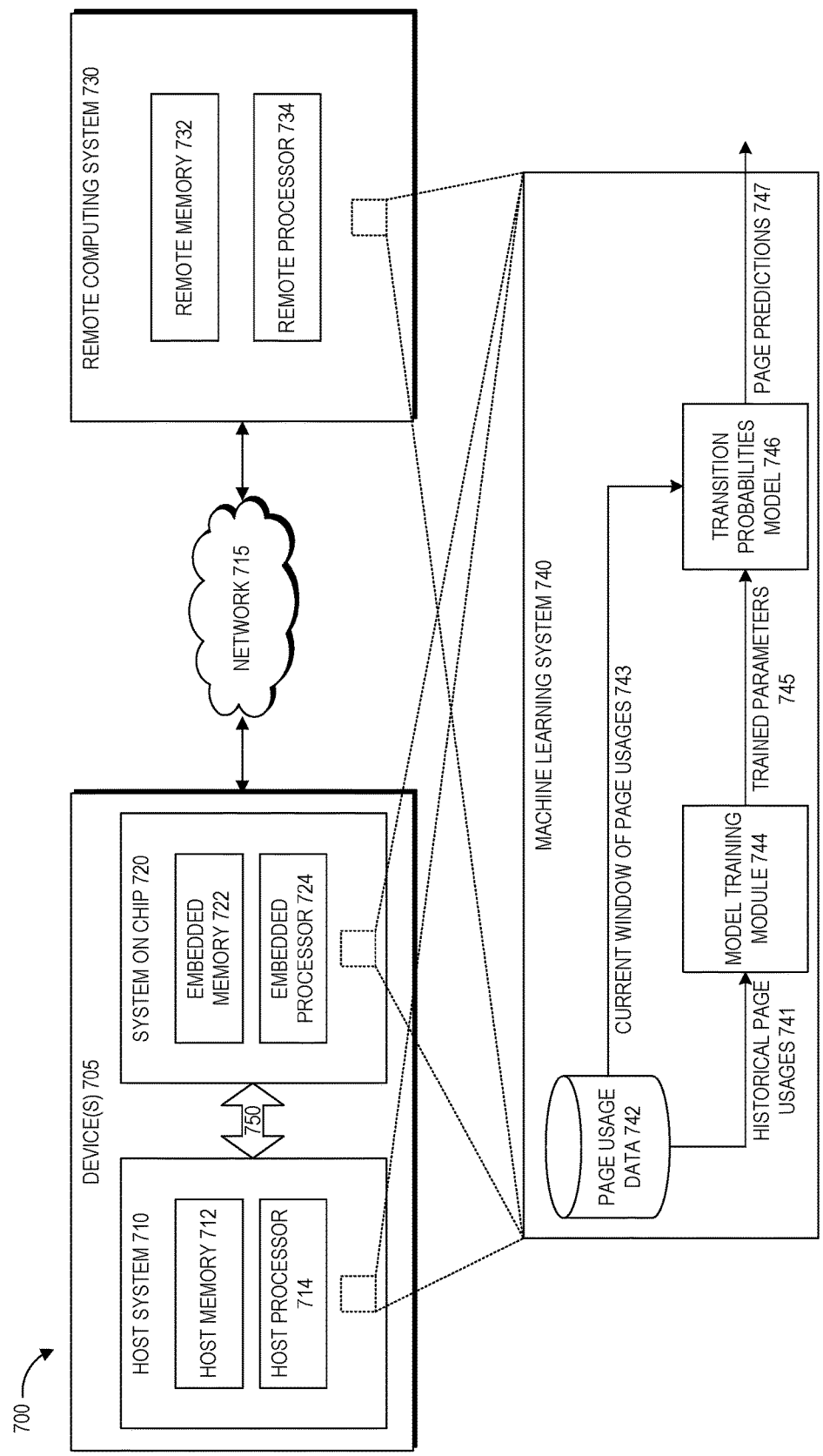
FIG. 7 depicts a high level schematic block diagram of a machine learning system for predictive page fetching as described herein.

FIG. 7 depicts a high level schematic block diagram of a system 700 for predictive page fetching as described herein. The system 700 includes device 705, remote computing system 730, and machine learning system 740. Some embodiments of the machine learning system 740 can be used to predict mode-specific page sets, as described with respect to FIG. 6B. Some embodiments of the machine learning system 740 for dynamic prediction of a next page or page sets based on real-time page usage data (e.g., data regarding page usage collected and analyzed as pages are fetched, or while or immediately after the pages are in use).

Device 705 can be, for example, a device including the memory power minimization architecture 200 of FIG. 2. As described above with respect to FIG. 2, device 705 includes a host system 710 having a host memory 712 and host processor 714, and also includes a system on chip 720 having an embedded memory 722 and an embedded processor 724. The host memory 712 can be the DDR 225 described above or another suitable electronic data storage structure. The host processor 714 can be the processor 220 described above or another suitable electronic processing unit. The embedded memory 722 can be SRAM 255, memory 640A, or memory 640B described above, or another suitable electronic memory embedded in system on chip 720. The embedded processor 724 can be the CPU 245 described above or another suitable electronic processing unit embedded in system on chip 720. The host system 710 and system on chip 720 communicate over communications bus 750.

The device 705 (or a number of devices 705) can communicate with remote computing system 730 over network 715 in some embodiments. Network 715 can be the Internet, a local network (e.g., a WiFi network), a satellite communications network (e.g., a cellular network), other suitable networks, or a combination of different types of networks. The remote computing system 730 can be a server or multiple servers, and may include a number of different geographically remote computing devices. The remote computing system 730 includes remote memory 732 and remote processor 734. Remote memory 732 can be one or more electronic memories configured to store page usage data, code representing instructions for training a machine learning model, and trained model parameters as described in more detail below. The remote processor 734 can be one or more electronic processors. Suitable processors can include general purpose processors, or in other embodiments can include graphics processing units (GPUs) or application specific integrated circuits (ASICs) optimized for training and/or use of machine learning models.

The machine learning system 740 includes page usage data repository 742, model training module 744, and transition probabilities model 746. As described in more detail below, the machine learning system 740 can be implemented in one or more electronic memories storing data and computer-executable instructions for performing the described training and/or prediction functions, and one or more hardware processors that execute the instructions.

As illustrated in FIG. 2, portions of all of the machine learning system 740 can be located in one or more of a number of different locations within the system 700. For example, the page usage data repository 742 can be incorporated into the embedded memory 722 of the system on chip 720 to store data representing usage of pages on that particular system on chip 720 on a particular device 705. As another example the page usage data repository 742 can be additionally or alternatively incorporated into the host memory 712 of the host system 710. In embodiments having portions of the page usage data repository 742 in both the system on chip 720 and the host system 710, page usage data can be periodically transferred from the embedded memory 722 to the host memory 712, for example according to a pre-determined schedule and/or when the size of embedded memory 722 used to store the page usage data reaches a certain threshold (e.g., total memory occupied or percentage of embedded memory 722 occupied). Further, the page usage data repository 742 can be incorporated into the remote memory 732 of the remote computing system 730, for example to store aggregate page usage data transferred from the host memory 712 and/or embedded memory 722 of a number of different devices 705.

The model training module 744 can be implemented as computer-readable instructions for training a designated machine learning model, stored in a memory, together with processor(s) that execute the instructions. The machine learning model can be a Markov chain model, hidden Markov chain model, recurrent neural network, linear system, extended Kalman filter, or another machine learning model suitable for identifying correlation between successive points in sequential data. The model training module 744 can use historical page usages 741 from the page usage data repository 742 to generate trained parameters 745 of the machine learning model, with such trained parameters representing correlations between sequences of pages.

For example, the model can be a Markov chain model, which can be well suited to the task of representing the statistical regularities of page sequences. A Markov chain model is defined by a number of states and a set of transitions with associated probabilities. According to the present disclosure, the number of states can correspond to a number of pages in a set of possible pages used by the system on chip 720. The set of possible pages can be pre-selected as all available pages, can be determined based on usage patterns as pages actually used during standby mode, or can be determined based on usage patterns as pages used more than some threshold number of times or frequency during standby mode. In some embodiments, states can additionally or alternatively correspond to sequences of two or more pages. Thus, a state of a Markov chain model as described herein can be defined as either a singular page or a sequence of pages.

The transitions emanating from a given state define a distribution over the possible next states. In a first order Markov chain, the probability of a given state depends only on the previous state. The disclosed Markov chain model can also define ends states, allowing the model to represent a distribution over sequences of different lengths and preferences for ending sequences with certain states.

In order to train the Markov model, the model training module 744 can use some or all of the historical page usages 741 to determine the probability parameters of the model. One suitable approach to determining the probability parameters involves maximum likelihood estimation. For example, the model training module 744 can use this approach to model the probability of $state_b$ following $state_a$ based on the number of occurrences of $state_b$ in the historical page usages 741 and the total number of pages in the sequence represented by the historical page usages 741. Another suitable approach can instead implement Bayesian approaches, for example Laplace estimates or m-estimates. For example, the model training module 744 can use such approaches to model the probability of $state_b$ following $state_a$ based at least partly on the number of times that $state_b$ follows $state_a$ in the historical page usages 741, the total number of pages in the sequence represented by the historical page usages 741, and the additional parameters of the Laplace estimates or m-estimates models.

In some embodiments, predictive pre-fetching may only be performed for pages that are likely (e.g., by equal to or greater than a threshold probability percentage, for example 90%) to occur next in the sequence within a predetermined window of time (e.g., the next millisecond). Thus, the training of the Markov model may be based on identifying and analyzing page sequences in the historical page usages 741 that occur within the predetermined window of time.

The trained probability parameters of the Markov model can be represented as a graph or database of transition probabilities (e.g., transition probabilities model 746) and stored in the embedded memory 722. In some embodiments, only probabilities that satisfy the likelihood and window of time criteria (e.g., page 1 is likely to follow page 2 within one millisecond with 90% or greater probability) can be included in the transition probabilities model 746 in order to minimize the amount of space occupied by the transition probabilities model 746 in the embedded memory 722. Beneficially, minimizing the total amount of data in the transition probabilities model 746 minimizes the amount of power required for the embedded memory 722 to store the transition probabilities model 746 in standby mode. The transition probabilities model 746 may be stored in the resident memory portion 615 of memory 640A or the locked pages pageable memory portion 625 of memory 640B in some embodiments.

In use, when a page already in the local memory is accessed or when page fault occurs, the embedded processor 724 can access the stored model and look up the requested page (or sequence of pages) to identify whether there is a next page or page sequence that should be predictively pre-fetched (e.g., page predictions 747). For example, the embedded processor 724 can look up the requested page(s) along a current state axis of a graph of the transition probabilities model 746. The embedded processor 724 can then check along the predicted state axis to identify whether there are any predicted next page(s) that are predicted to be requested next within any predetermined time window and/ or with any threshold confidence level. As another example, the embedded processor 724 can look up the requested page(s) in a current state column or row of a database of the transition probabilities model 746 and then scan the corresponding row or column to identify whether there are any predicted next page(s) that are predicted to be requested next within any predetermined time window and/or with any threshold confidence level.

If there are such predicted next page(s), the embedded processor 724 can check to see whether these pages are already stored in the embedded memory 722. If not, the page predictions 747 can be predictively pre-fetched into the pageable memory. In embodiments in which a page fault triggers the embedded processor 724 to generate the page predictions 747, the initial page requested and any predicted page(s) can be fetched together from the secondary memory. Beneficially, in the scenario in which the predicted pages are used next as predicted, this can save the power costs of additional page faults. If the pages are not used next as predicted, in standby mode the predictive pre-fetching can result in temporary unneeded power increases due to storage of the predicted pages in powered-on portions of pageable memory until they are evicted. The probability thresholds of the Markov model can be dynamically tuned such that the balance between power savings in page fault reductions and power costs due to storage of unused predicted pages ultimately results in net power savings, for example based on additional machine learning analysis of the usage of predicted pages and their predicted probabilities in page usage data 742.

As another example, the model can be a feedforward neural network or a recurrent neural network, which is a form of artificial neural network suitable for identifying patterns in sequential data. Artificial neural networks typically have multiple layers of nodes. The input layer has input nodes which send input data via connections to the hidden layer of nodes, and then via more connections through any additional hidden layers of nodes to the output layer of output nodes. Each node can be logically connected with many others by connections, for example with some or all nodes in adjacent layers. Nodes may be considered to be "connected" when the input values to the function associated with a current node include the output of functions associated with nodes in a previous layer, multiplied by weights associated with the individual "connections" between the current node and the nodes in the previous layer. The connections may store parameters called weights that can manipulate the data in the calculations. Activation functions and patterns in the hidden layer(s) can be considered as an encoding of how the network is programmed to identify significant features of the inputs.

The strengths of node connections are typically learned from data during the training process. The neural network can repeatedly process input training data, and the parameters (e.g., the weight matrices of the node connection strengths) of the neural network can be modified until the model produces (or "converges" on) the correct or preferred output provided to the neural network during training. The modification of weight values may be performed through a process referred to as "back propagation." Back propagation includes determining the difference between the expected model output and the obtained model output, and then determining how to modify the values of some or all parameters of the model to reduce the difference between the expected model output and the obtained model output.

The model training module 744 can train a neural network using windows of the historical page usages 741 to generate input data and subsequent pages or page sequences following these windows as expected output data. The input data can include n separate data elements or "dimensions," corresponding to the n nodes of the neural network input layer (where n is some positive integer). Each node of the input layer (and of the output layer) can correspond to a particular page (or pre-determined page sequence) in a set of possible pages used by the system on chip 720. Each data element provided to the input layer may be a value, such as a floating point number or integer, for example a 1 corresponding to a page occurring within the window 743 and a 0 representing a page not occurring within the window 743. The values of the output nodes can be a value between 0 and 1, for example each representing the probability that a particular page will be used next (or within a predetermined time) in the sequence.

The model training module 744 can train the parameters (e.g., weight matrices of the hidden layers) of the neural network to predict the expected outputs from the inputs. Once trained, the trained parameters 745 represent encodings of the sequential patterns of the pages in the set of possible pages and can be stored as transition probabilities model 746; probabilities can be generated by passing the current window of page usages 743 through the trained model. Alternatively, a set of probabilities can be generated for some or all possible input pages using the trained model, and these pre-generated probabilities (or a subset thereof satisfying probability threshold requirements) can be stored as a graph or database for the transition probabilities model 746.

In some embodiments, the pages in the expected output data can be identified based on whether they occur within a predetermined time interval (e.g., a millisecond or several milliseconds) of the previous page or page sequence in the page usage data 742. This can enable the predictions generated by the neural network to reflect probabilities of requests for the pages mapped to the output nodes occurring within such a time interval of requests for the pages mapped to the input nodes.

The above-described training and resulting transition probabilities models 746 relate primarily to dynamic pre-fetching of pages, that is, pre-fetching that occurs in response to current page requests or in-use pages. In some embodiments, such machine learning analysis (or other suitable machine learning analyses) can be modified to be based on only a portion of the page usage data 742 corresponding to pages used while the device 705 is operated in a particular mode. The mode may be standby mode of the host processor 714, power state of the communication bus 750, or a combination of modes (e.g., host processor 714 in standby mode and a PCIe bus operated in the L2 state). The resulting data can be a set of pages that are likely to be used in that particular mode. For example, statistical analysis by the machine learning system 740 can identify any pages historically used during standby mode, or a subset of such pages used above a threshold number of times or above a threshold frequency. The thresholds can be adjusted based on additional analysis of page usage data 742 to optimize the power balance between the cost of page faults for retrieving pages omitted from the page set and the data size of the resulting page set (and the corresponding amount of power required to store such data in the embedded memory 722). An index of the set of pages for a particular mode (or for multiple particular modes) can be provided to the embedded memory 722 to enable pre-fetching of such modal page sets upon entering the corresponding mode, as described with respect to FIG. 6B. It will be appreciated that the system on chip 720 can be configured to implement one or both of the dynamic pre-fetching and modal pre-fetching described herein.

As described above, transition probabilities model 746 is the machine learning model with its parameters set after training by the model training module 744, and can be implemented as electronically stored trained parameters and computer-readable instructions for processing data through the trained parameters of the machine learning model, together with processor(s) that execute the instructions. Given an input page or pages (current window of page usages 743), the embedded processor 724 can use transition probabilities model 746 to determine the specific pages that are likely to follow the presently requested or used pages together with corresponding probabilities. Some embodiments can additionally predict the amount of time between the current window of page usages 743 and the predicted pages. These pages can be output as page predictions 747 and predictively pre-fetched if they are not already present in the pageable or resident memory portions of the embedded memory 722.

Similar to the page usage data repository 742, the model training module 744 can be incorporated into one or more of the system on chip 720, host system 710, and remote computing system 730. The transition probabilities model 746 is used by the system on chip 720 and thus can be incorporated into the system on chip 720, though the trained model can also be generated by and stored by (temporarily or permanently) the host system 710 and/or remote computing system 730. Various distributions of the machine learning system 740 across the components of the system 700 are discussed in more detail below.

In some embodiments, the disclosed page prediction machine learning models can be trained on-chip by the system on chip 720, for example when the host processor 714 is operating in active mode. The resulting trained transition probabilities model 746 can be stored in the embedded memory 722 and used for predictive pre-fetching by the system on chip 720 when the host processor 714 is operating in standby mode. In other embodiments, the system on chip 720 can be provided with a trained transition probabilities model 746 generated by either the host system 710 or the remote computing system 730.

Because machine learning model training can be computationally expensive, in some embodiments the model training module 744 may not be incorporated in the system on chip 720 due to its more limited memory and processing capabilities relative to the host system 710. In such embodiments, the disclosed page prediction machine learning models can be trained intermittently or periodically by the host system 710, with the trained model pushed back to the system on chip 720 for use in predictive page fetching.

Further, in some embodiments the model training module 744 may not be incorporated into the host system 710 due to its more limited memory and processing capabilities relative to the remote computing system 730. In such embodiments, the disclosed page prediction machine learning models can be trained intermittently or periodically by the remote computing system 730, with the trained model pushed back to the system on chip 720 over network 715 for use in predictive page fetching.

Beneficially, the remote computing system 730 can collect page usage data 742 from the device 705 and a number of other devices 705, whether or not they are implementing the disclosed power optimization demand paging. As such, transition probability models 746 generated by the remote computing system 730 can be based on aggregate data from a number of different devices, or based on usage data from a singular different device. This can be beneficial in scenarios in which the device 705 has no or limited usage data usable for training a transition probability model 746. In these scenarios, the device 705 may be unable to use the transition probability model 746 without the training enabled by the data from other device(s) 705. The resulting transition probability model can still enable the device 705 to achieve power savings relative to operation without any predictive pre-fetching. In some embodiments, aggregate data (or data from a singular different device) can be sent from the remote computing system 730 to the device 705 for training the transition probabilities model 746 locally based on such data.

In other embodiments, any of the system on chip 720, host system 710, and remote computing system 730 can generate a personalized transition probability model 746 based only on usage data from the particular device 705. Such personalized transition probability models 746 can reflect the actual usage patterns of that particular device 705, and thus may be more likely to lead to accurate page predictions and corresponding higher power savings.

In some embodiments, the embedded memory 722 of a new device 705 can be provided with a transition probabilities model generated based on page usage data 742 from one or more other devices 705. This model may be updated later by the new device 705 (or by remote computing system 730) after accumulation of a sufficient amount of page usage data 742 based on usage of the device 705. In other embodiments, the new device 705 may wait until it has accumulated a sufficient amount of page usage data 742 to generate its own model.

Figure 8:
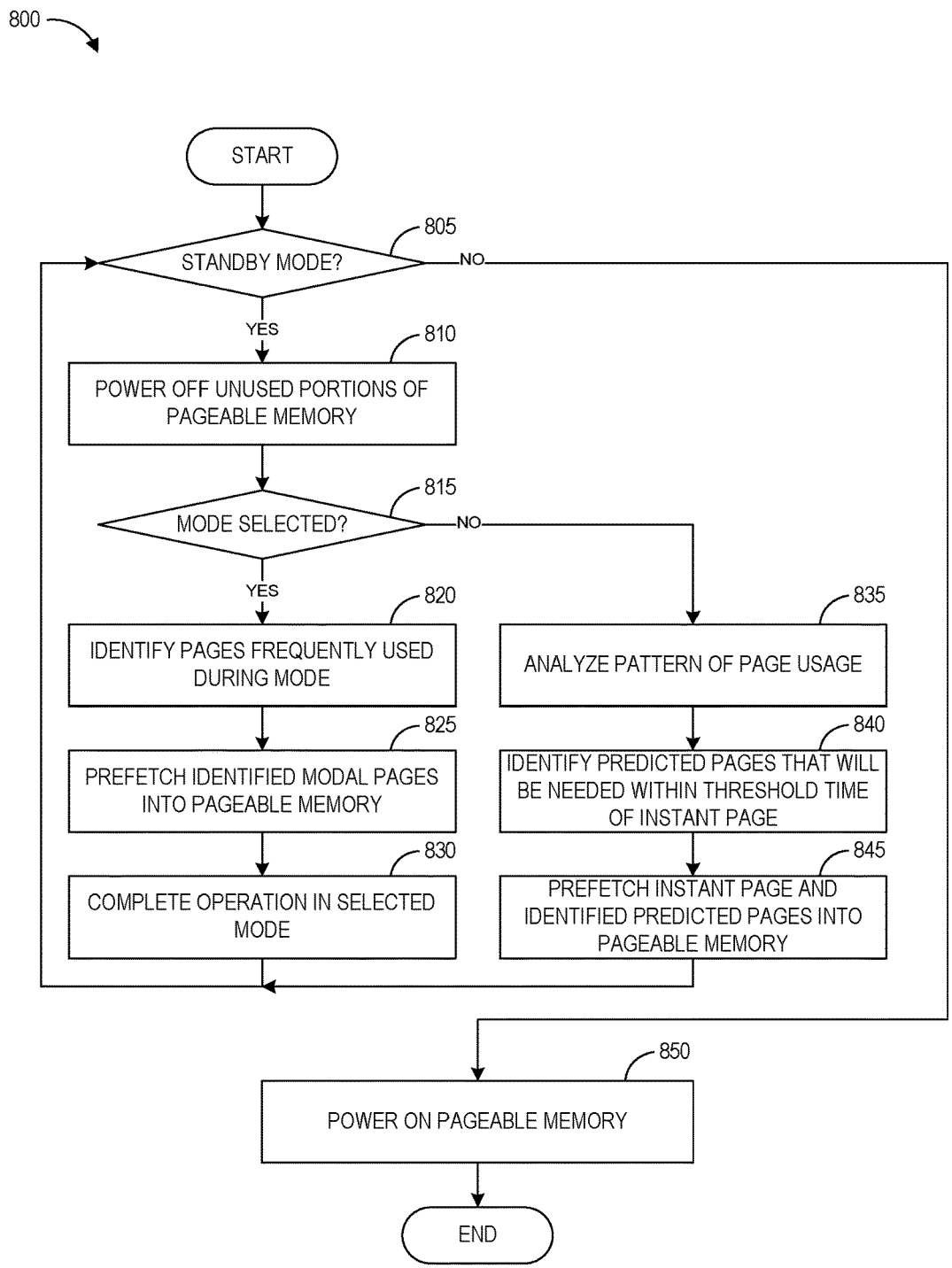
FIG. 8 illustrates a flow diagram of an example process for pre-fetching pages into a memory in standby mode according to the present disclosure.

FIG. 8 illustrates a flow diagram of an example process 800 for pre-fetching pages into a memory in standby mode according to the present disclosure. The process 800 can be implemented by the architecture 200 or the device 705 in some embodiments. As such, the embedded processor referred to below can be the CPU 245, embedded processor 724, or another suitable processor, the embedded memory referred to below can be SRAM 255, the embedded memory 722, or another suitable memory, the host processor referred to below can be processor 220, host processor 714, or another suitable processor, and the host memory referred to below can be the DDR 225, host memory 712, or another suitable memory.

The process 800 may begin in response to an event, such as on a predetermined or dynamically determined schedule, on demand when initiated by a system administer or particular software module, or in response to some other event. When the process 800 is initiated, a set of executable program instructions stored on one or more non-transitory computer-readable media (e.g., an on-chip non-volatile memory or memory in a host system) may be loaded into the embedded memory or a memory of an on-chip processor (e.g., random access memory or "RAM"). The executable instructions may then be executed by a hardware-based computer processor (e.g., CPU 245, embedded processor 724) of the system on chip or computing device. In some embodiments, the process 800 or portions thereof may be implemented on multiple computing devices and/or multiple processors, serially or in parallel.

At block 805, the embedded memory can determine whether the host processor is operating in standby mode or another low-power mode (e.g., not the highest power active operational mode). This can involve pinging the host system that includes the host processor or accessing stored data provided by the host system when the host processor enters standby mode. If the host processor is not operating in standby mode, the process 800 may loop to block 850 to power on any powered-off portions of the pageable memory. However, if the device was not previously operating in standby mode, the process 800 can instead bypass block 850 and end, resuming. The process 800 may resume again upon occurrence of a particular event or according to a predetermined schedule.

At block 810, in response to determining that the host processor is operating in standby mode, the embedded processor can evict any determined pages from pageable embedded memory and power down unused portions of the pageable memory. As described above, this can include all pages in the pageable memory or a subset of such pages that satisfy various eviction criteria. In some embodiments, block 810 may be performed after block 825.

At block 815, the embedded processor can determine whether a particular mode is selected for operating any portion of the system on chip or host device. This can include the standby mode identified at block 805, and/or other operational modes (e.g., power states of a PCIe link).

Blocks 820, 825, and 830 represent example blocks of a sub-process for modal pre-fetching. At block 820, in response to determining that there is a particular operational mode selected, the host processor can identify pages frequently used during that mode. For example, the host processor can access an index of such pages stored in the embedded memory or in the host memory. This index can be pre-generated based on machine learning analysis of historical page usage data from the device and/or at least one additional device, and may be periodically or intermittently updated based on new page usage data. As one example, the modal page set may be pages used when the host processor is in standby mode.

At block 825, the host processor can fetch the identified set of modal pages, power on a portion of the pageable memory (or not power down this portion of pageable memory if block 810 is performed later), and store the pages in the pageable memory. The host processor can further "lock" these pages into the pageable memory, for example by storing an indicator in association with such modal pages that indicates that they are not subject to LRU timeouts or other eviction criteria.

At block 830, the host processor can determine that operations in the selected mode have been completed. In some embodiments, this can involve reiterating block 805 and then transitioning to block 850 to power on any powered-off portions of the pageable memory for operation in active mode.

Blocks 835, 840, and 845 represent example blocks of a sub-process for dynamic pre-fetching. At block 835, in response to the embedded processor determining at block 815 that no mode is selected (or alternatively in response to determining that modal pages have already been pre-fetched and that operation in the mode is continuing), the embedded processor can analyze the current pattern of page usage. As described above with respect to FIG. 7, this can involve passing a currently requested/used page/page sequence through a trained machine learning model or looking up the currently requested/used page/page sequence in a transition probability model pre-generated by such a machine learning model.

At block 840, if the embedded processor predicts based on the results of block 835 whether any predicted pages will be needed within any threshold time of the currently requested/used page/page sequence. For example, the embedded processor can identify any page that is needed within the next millisecond, milliseconds, second, etc. with a probability of 50% or greater, 75% or greater, 90% or greater, 95% or greater, etc. As described above, these thresholds can be set based on analysis of historical page usage data of predicted pages in order to optimize power savings.

At block 845, the embedded processor can pre-fetch the requested page and any identified predicted pages into the pageable memory, for example using a single page fault to retrieve multiple pages including the requested page and one or more pages predicted to sequentially follow the requested page. To illustrate, the embedded processor can identify that event X has occurred and that event Y is predicted to occur next, and can pre-fetch the pages required for event Y along with fetching the pages for event X. Some embodiments can predict multiple next events and accordingly fetch the pages for some or all of these next events. This batch fetching can be more efficient from a power consumption perspective than separately fetching the pages needed for these events. Alternatively, the embedded processor can predict specific pages instead of specific events, instead predicting that if page M is used then page N is predicted to be used next. In such embodiments the embedded processor can pre-fetch page N together with page M, again accomplishing a more power-efficient batch fetching than multiple individual page transfers. Notably, pages fetched in the dynamic pre-fetching may not be locked into the pageable memory and thus can be identified for subsequent eviction.

The process 800 can loop through blocks 835 through 845 any number of times while operating in standby mode. Thus, after completion of block 845 the process can loop back to block 805 to check whether the host processor is still operating in standby mode. If so, block 835 can be performed again in response to a predetermined event, for example a page fault.

Figure 9:
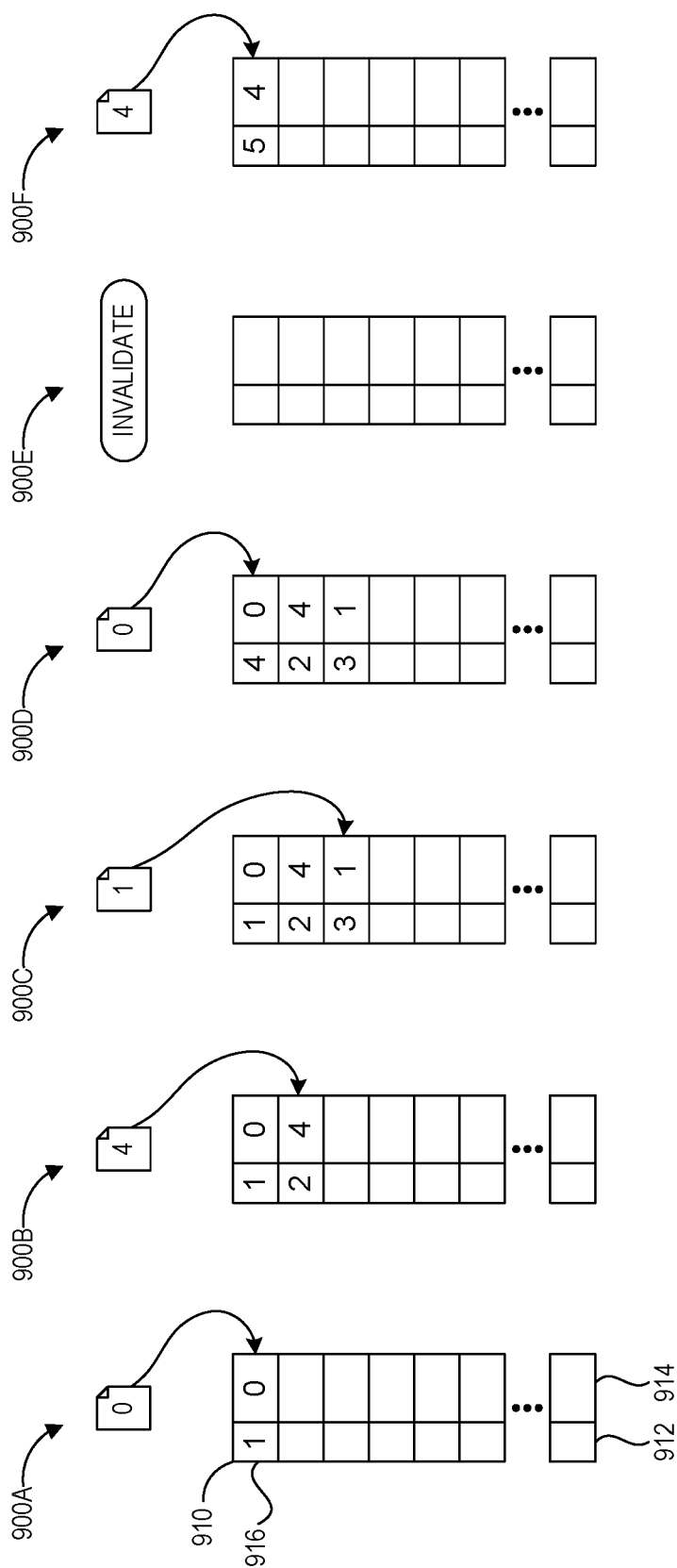
FIG. 9 depicts a graphical illustration of example steps in a modified least recently used (LRU) scheme according to the present disclosure.

FIG. 9 depicts a graphical illustration of example steps 900A-900F in a modified least recently used (LRU) scheme according to the present disclosure. Typically, LRU processes are implemented when there are a limited number of entries in a page table compared to the number of used pages. The page table is used to store an index of recently used pages. For example, if a page is accessed that is present in local memory (e.g., in pageable or resident portions of an on-chip memory or fetched into pageable memory) but is not identified in the page table, this will trigger an exception to add an entry of an identifier of the accessed page. This can include storing a timestamp or sequential ordering number in association with the identifier of the accessed page, or moving the page identifiers through different positions in the page table from a most recently used position to a least recently used position. This exception can be created by the embedded processor that will be serviced by the SOC's operating system software in some embodiments. If the identifier of the accessed page is in the page table, the timestamp can be updated or that identifier can be moved to the most recently used position. If the page table entries are full, a new exception also triggers the SOC's operating system to evict an old entry from the page table. The page with the oldest timestamp (or in a least recently used position) is the least-recently-used page, and this is the page that is evicted. When page identifiers are evicted from the page table this can serve as an LRU timeout that also causes the code or data of the page to be evicted from pageable memory. Such techniques are useful when there is a much smaller size of the page table than the number of pages accessed in a sequence, as this keeps the page table populated with very recently used pages.

However, during standby mode the computing operations of the present disclosure can use fewer pages than in active mode, resulting in a smaller number of pages in a standby sequence than there are entries in the page table. As such, according to existing LRU schemes there may never be an eviction of pages from the page table that would allow the operating system software to infer which pages have been recently used and which pages have not.

The example process depicted in FIG. 9 addresses this problem by having the SOC OS software periodically invalidate entries in the page table so that a next access to a particular page will produce an exception, along with handling this exception by providing a valid entry in the page table for the accessed page (and optionally marking the page as currently in-use).

At step 900A, the system on chip requests page 0. Page 0 is not already in page table 910, so this triggers an exception and page 0 is added to a first row 916 of a page index column 914 of the page table 910. A time code of "1" is added to a time code column 912 of the page table 910, representing that page 0 was requested first in the current page sequence. Alternate embodiments can instead use time stamps, for example representing a time on a clock of the system on chip.

Similarly, at step 900B, the system on chip requests page 4. Page 4 is not already in the page table 910, so this triggers an exception and page 4 is added to a next row of the page index column 914 of the page table 910. A time code of "2" is added to the time code column 912 of the page table 910, representing that page 4 was requested second in the current page sequence. Reference numbers shown for the page table 910 at step 900A are omitted from steps 900B-900F for simplicity and clarity of the drawings, however, it will be appreciated that the page table 910 includes the same columns at each step.

At step 900C, the system on chip requests page 1. Page 1 is not already in the page table 910, so this triggers an exception and page 1 is added to a next row of the page index column 914 of the page table 910. A time code of "3" is added to the time code column 912 of the page table 910, representing that page 1 was requested third in the current page sequence.

At step 900D, the system on chip requests page 0 again, so the value in the time code column 912 of the page table 910 is updated to 4, representing that page 0 was most recently request fourth in the current page sequence. Steps 900A-900D can be carried out similarly to existing LRU techniques in some embodiments. However, at step 900D when page 0 is requested again, as illustrated in FIG. 9 there are still many empty rows in the page table 910. This can be beneficial for example in scenarios in which the page table 910 is a hardware page table and more entries are needed for LRU operations in active mode, as the device implementing the process 900 would typically use many more pages in active mode than in standby mode. Though more than the three example depicted pages may be used in standby mode, steps 900A-900D provide an example illustration of how fewer pages are used in standby mode than there are entries in the hardware page table. Thus, no pages would be evicted from the page table 910 and correspondingly the system on chip would not have LRU timeouts that cause the page data to be evicted from pageable memory.

To address this problem, step 900E depicts one example of how the presently disclosed techniques operate to artificially reduce the size of a hardware page table. At step 900E, the SOC invalidates the entries in the page table 910. As illustrated, the SOC can invalidate all entries at once, effectively erasing the entries in the page table 910. In alternate embodiments the SOC can cycle through the in-use pages, invalidating one at a time within the page table 910 to spread out the performance impact of the exceptions caused by accessing a page without an entry in the page table 910. Some embodiments can invalidate groups of pages at a time and can cycle through groups of in-use pages one group at a time. This invalidation may also trigger LRU timeouts, and if so the corresponding page data may be evicted from pageable memory. The invalidation will cause the next access to a page to produce an exception, and the SOC can handle the exception by providing a valid entry in the page table 910 for the accessed page and marking the page as being currently in-use. Thus, even when the number of pages used in standby mode is fewer than the number of entries in the page table 910, the SOC can still track which pages have been used recently and which have not, enabling the SOC to evict unused pages from pageable memory and power down the corresponding portion of the pageable memory that was used to store the page.

Overview of Certain Embodiments

Embodiments of the disclosure can be described in view of the following clauses.

1. A system comprising:
   a host system including a host processor configured to be operated in a sleep state and a host memory;
   a WiFi system including
      a computer-readable memory storing instructions to control operations of the WiFi system,
      an embedded processor configured by the instructions in the computer-readable memory, and
      an embedded memory configured for storing one or both of code and data usable during the operations of the WiFi system, the embedded memory including a resident memory portion and a pageable memory portion; and
   a communications bus configured to provide data communications between at least the embedded memory and the host memory;
   wherein the instructions configure the embedded processor to fetch a page from the host memory into the pageable memory portion without waking the host processor from the sleep state.

2. The system of Clause 1, wherein the WiFi system comprises a WiFi system on a chip, and wherein the computer-readable memory, the embedded processor, and the embedded WiFi memory are integrated into the chip.

3. The system of any one of Clauses 1-2, wherein the instructions configure the embedded processor to power down vacant portions of the pageable memory.

4. The system of any one of Clauses 1-4, wherein the instructions configure the embedded processor to operate the communications bus in at least a full power state and a lower power state.

5. The system of Clause 4, wherein the instructions configure the embedded processor to transition the communications bus between the lower power state and the full power state by sending a clock request signal to an additional processor of the host system that consumes less power during operations than the host processor.

6. The system of Clause 5, wherein the additional processor is configured to act as a proxy bus master without waking the host processor when the host processor is being operated in the sleep state.

7. The system of any one of Clauses 1-6, wherein the host system comprises a power manager, and wherein the communications bus comprises a PCIe communications bus configured to send a direct vote to the power manager of the host system.

8. The system of Clause 7, wherein the instructions configure the embedded processor to fetch the page from the host memory without waking the host processor from the sleep state by sending the direct vote from the PCIe communications bus to the power manager of the host system.

9. A method comprising, under control of one or more computing devices:
determining, via an embedded processor of a system on chip, to fetch a page from a host memory of a host system including the host memory and a host processor configured to be operated in a sleep state;
identifying that the host processor is operating in the sleep state; and
in response to identifying that the host processor is operating in the sleep state, fetching the page from the host memory into an embedded memory of the system on chip without waking the host processor from the sleep state.

10. The method of Clause 9, wherein fetching the page comprises operating a communications bus to transfer the page from the host memory into the embedded memory of the system on chip.

11. The method of Clause 10, wherein operating the communications bus comprises transitioning the communications bus from a low power state to a full power state.

12. The method of Clause 11, wherein transitioning the communications bus comprises sending a clock request signal to an additional processor of the host system that consumes less power during operations than the host processor, wherein the additional processor is configured to act as a proxy bus master without waking the host processor when the host processor is being operated in the sleep state.

13. The method of any one of Clauses 10-12, wherein the host system comprises a power manager, and wherein the communications bus comprises a PCIe communications bus configured to send a direct vote to the power manager of the host system, wherein fetching the page from the host memory without waking the host processor from the sleep state comprises sending the direct vote from the PCIe communications bus to the power manager of the host system.

14. A system on chip comprising:
a computer-readable memory storing instructions to control operations of the system;
an embedded processor configured by the instructions in the computer-readable memory; and
an embedded memory configured for storing one or both of code and data usable during the operations of the system, the embedded memory including a resident memory portion and a pageable memory portion;
wherein the instructions configure the embedded processor to transfer, via a communications bus, a page between the pageable memory portion and a secondary memory of a host system outside of the system on chip without waking a host processor associated with the secondary memory.

15. The system on chip of Clause 14, wherein the instructions configure the embedded processor to:
operate the communications bus in at least a full power state and a lower power state; and
transition the communications bus between the lower power state and the full power state by sending a clock request signal to an additional processor of the host system that consumes less power during operations than the host processor, wherein the additional processor is configured to act as a proxy bus master without waking the host processor when the host processor is being operated in the sleep state.

16. The system on chip of any one of Clauses 14-15, wherein the host system comprises a power manager, wherein the communications bus comprises a PCIe communications bus configured to send a direct vote to the power manager of the host system, and wherein the instructions configure the embedded processor to fetch the page from the host memory without waking the host processor from the sleep state by sending the direct vote from the PCIe communications bus to the power manager of the host system.

17. The system on chip of any one of Clauses 14-17, wherein a chip comprises the system on chip, wherein the chip comprises a single wafer of semiconductor material, and wherein the embedded processor and embedded memory are formed as electronic components in the semiconductor material.

18. The system on chip of any one of Clauses 14-17, wherein the instructions configure the embedded processor to power down vacant portions of the pageable memory.

19. The system on chip of Clause 18, wherein the instructions configure the embedded processor to:
fetch the page into the pageable memory portion from the secondary memory in response to identifying a need for the page during operations of the system; and
evict the page from the pageable memory in response to determining that the page is no longer needed.

20. A device comprising:
a host system including a host processor configured to be operated in a sleep state and a host memory;
a system on chip including:
a computer-readable memory storing instructions to control operations of the system on chip,
an embedded processor configured by the instructions in the computer-readable memory, and
an embedded memory configured for storing pages usable during the operations of the system on chip; and
a communications channel configured to provide data communications between at least the embedded memory of the system on chip and the host memory;
wherein the instructions configure the embedded processor to transfer a page between the embedded memory and the host memory without waking the host processor from the sleep state.

21. The system of Clause 20, wherein a chip comprises the system on chip, wherein the chip comprises a single wafer of semiconductor material, and wherein the embedded processor and embedded memory are formed as electronic components in the semiconductor material.

22. The system of Clause 21, wherein the system on chip comprises a WiFi system.

23. The system of any one of Clauses 20-22, wherein the embedded memory comprises a resident memory portion and a pageable memory portion, wherein the instructions configure the embedded processor to power down vacant portions of the pageable memory.

24. The system of Clause 23, wherein the instructions configure the embedded processor to:
fetch the page into the pageable memory portion from the secondary memory in response to identifying a need for the page during operations of the system; and evict the page from the pageable memory in response to determining that the page is no longer needed.
25. The system of any one of Clauses 20-24, wherein the instructions configure the embedded processor to operate the communications bus in at least a full power state and a lower power state.
26. The system of Clause 25, wherein the instructions configure the embedded processor to transition the communications bus between the lower power state and the full power state by sending a clock request signal to an additional processor of the host system that consumes less power during operations than the host processor.
27. The system of Clause 26, wherein the additional processor is configured to act as a proxy bus master without waking the host processor when the host processor is being operated in the sleep state.
28. The system of any one of Clauses 20-27, wherein the host system comprises a power manager, and wherein the communications bus comprises a PCIe communications bus configured to send a direct vote to the power manager of the host system.
29. The system of Clause 28, wherein the instructions configure the embedded processor to fetch the page from the host memory without waking the host processor from the sleep state by sending the direct vote from the PCIe communications bus to the power manager of the host system.
30. The system of Clause 29, wherein the instructions configure the embedded processor to directly access the page in the host memory via the PCIe communications bus.
31. A system comprising:
a host system including a host memory and a host processor configured to be operated in an active mode and in a standby mode, wherein the host processor consumes less power when operated in the standby mode than in the active mode; and
a WiFi system including
a computer-readable memory storing instructions to control operations of the WiFi system,
an embedded memory configured for storing one or both of code and data usable during the operations of the WiFi system, the embedded memory including a resident memory portion and a pageable memory portion, and
an embedded processor configured by the instructions in the computer-readable memory, the instructions configuring the embedded processor to power down unmapped portions of the pageable memory in response to determining that the host processor is operating in the standby mode.
32. The system of Clause 31, wherein the WiFi system comprises a WiFi system on a chip, and wherein the computer-readable memory, the embedded processor, and the embedded WiFi memory are integrated into the chip.
33. The system of any one of Clauses 31-32, wherein the instructions configure the embedded processor to fetch a page from the host memory into the pageable memory portion without waking the host processor from the standby mode.
34. The system of any one of Clauses 31-33, wherein the instructions configure the embedded processor to:
continue to power down any newly unmapped portions of the pageable memory when the host processor is operating in the standby mode;
provide power to the resident memory when the host processor is operating in the standby mode; and
provide power to the resident memory and the entire pageable memory when the host processor resumes operation in the active mode.
35. The system of any one of Clauses 31-34, wherein, when the host processor is operating in the standby mode, the instructions configure the embedded processor to:
identify a page fault condition for a requested page that is not in the pageable memory; and
fetch the page from the host memory.
36. The system of Clause 35, wherein, when the host processor is operating in the standby mode, the instructions configure the embedded processor to:
power on a portion of the pageable memory to store the page;
perform a process relating to the page; and
in response to concluding the process and determining that a least recently used (LRU) timeout has elapsed for the page:
evicting the page from the pageable memory, and
powering down the portion of the pageable memory.
37. The system of Clause 36, wherein the instructions configure the embedded processor to determine that the LRU timeout has elapsed for the page based at least partly on periodic invalidation of entries in a hardware page table.
38. The system of Clause 37, wherein the WiFi system comprises the hardware page table.
39. A method comprising, under control of one or more computing devices:
establishing communications between an embedded processor of a system on chip and a host system, the system on chip and the host system cooperatively operating within a device, the system on chip including an embedded processor and an embedded memory comprising pageable memory, the host system including a host memory and a host processor configured to be operated in at least a standby mode;
identifying, via the system on chip, that the host processor is operating in the standby mode; and
in response to identifying that the host processor is operating in the standby mode, powering down unmapped portions of the pageable memory.
40. The method of Clause 39, further comprising evicting pages previously stored in the portions of the pageable memory.
41. The method of any one of Clauses 39-40, further comprising allowing data or code of pages previously stored in the portions of the pageable memory to be lost due to powering down the portions of the pageable memory.
42. The method of any one of Clauses 39-41, further comprising:
determining, via the embedded processor, to fetch a page from the host memory of the host system with the host processor operating in standby mode;
and
fetching the page from the host memory into an embedded memory of the system on chip without waking the host processor from the sleep state.
43. The method of any one of Clauses 39-42, further comprising:
powering down any unmapped portions of the pageable memory while the host processor is operating in the standby mode;
receiving an indication that the host processor has resumed operation in an active mode; and in response to receiving the indication, providing power to the entire pageable memory.

44. The method of any one of Clauses 39-43, further comprising:
    identifying a page fault condition for a requested page that is not in the pageable memory; and
    fetching the page from the host memory.

45. The method of Clause 44, wherein fetching the page further comprises:
    powering on a portion of the pageable memory corresponding to a data size of the page; and
    storing the page in the portion of the pageable memory.

46. The method of Clause 45, further comprising:
    performing a process relating to the page;
    concluding the process;
    determining that a least recently used (LRU) timeout has elapsed for the page; and
    in response to the concluding and the determining that the LRU timeout has elapsed:
        evicting the page from the pageable memory, and
        powering down the portion of the pageable memory.

47. The method of Clause 46, further comprising determining that the LRU timeout has elapsed for the page based at least partly on periodic invalidation of entries in a hardware page table.

48. A system on chip comprising:
    a computer-readable memory storing instructions to control operations of the system;
    an embedded memory configured for storing one or both of code and data usable during the operations of the system, the embedded memory including a resident memory portion and a pageable memory portion; and
    an embedded processor configured by the instructions in the computer-readable memory to:
        determine, via a communications bus, whether a host processor of a host system outside of the system on chip is operating in a standby mode or an active mode, and
        in response to determining that the host processor is operating in the standby mode, power down unused portions of the pageable memory.

49. The system on chip of Clause 48, wherein, in response to determining that the host processor is operating in the standby mode, the instructions configure the embedded processor to maintain power to the resident memory portion.

50. The system on chip of any one of Clauses 48-49, wherein the instructions configure the embedded processor to:
    determine to fetch a page from the host memory of the host system with the host processor operating in standby mode; and
    copy the page from a host memory of the host system into the pageable memory without waking the host processor from the sleep state.

51. The system on chip of any one of Clauses 48-50, wherein the instructions configure the embedded processor to:
    identify a page fault condition for a requested page that is not in the pageable memory; and
    fetch the page from a host memory of the host system.

52. The system on chip of Clause 51, wherein, to fetch the page, the instructions configure the embedded processor to:
    power on a portion of the pageable memory corresponding to a data size of the page; and
    store the page in the portion of the pageable memory.

53. The system on chip of Clause 52, wherein the instructions configure the embedded processor to:
    perform a process relating to the page;
    conclude the process;
    determine that a least recently used (LRU) timeout has elapsed for the page;
    evict the page from the pageable memory; and
    power down the portion of the pageable memory.

54. The system on chip of Clause 53, wherein the instructions configure the embedded processor to determining that the LRU timeout has elapsed for the page based at least partly on periodic invalidation of entries in a hardware page table.

55. A device comprising:
    a host system including a host processor configured to be operated in a sleep state and a host memory;
    a system on chip including:
        a computer-readable memory storing instructions to control operations of the system on chip,
        an embedded processor configured by the instructions in the computer-readable memory, and
        an embedded memory configured for storing pages usable during the operations of the system on chip; and
    a communications channel configured to provide data communications between at least the embedded memory of the system on chip and the host memory;
    wherein the instructions configure the embedded processor to power down unmapped portions of the embedded memory in response to determining that the host processor is operating in the standby mode.

56. The system of Clause 55, wherein a chip comprises the system on chip, wherein the chip comprises a single wafer of semiconductor material, and wherein the embedded processor and embedded memory are formed as electronic components in the semiconductor material.

57. The system of Clause 56, wherein the system on chip comprises a WiFi system.

58. The system of any one of Clauses 55-57, wherein the embedded memory comprises a resident memory and a pageable memory, wherein the instructions configure the embedded processor to:
    power down vacant portions of the pageable memory when the host processor is operating in the standby mode; and
    maintain power to the resident memory portion when the host processor is operating in the standby mode.

59. The system of Clause 58, wherein the instructions configure the embedded processor to:
    fetch the page from the host memory into the pageable memory in response to identifying a need for the page during operations of the system, wherein fetching the page includes powering on a portion of the pageable memory corresponding to a data size of the page; and
    evict the page from the pageable memory in response to determining that the page is no longer needed, wherein evicting the page includes powering down the portion of the pageable memory.

60. The system of Clause 59, the system on chip comprising a hardware page table, wherein the instructions configure the embedded processor to evict the page from the pageable memory after detecting a least recently used (LRU) timeout associated with the page, wherein detecting the LRU timeout includes periodically invalidating entries of the hardware page table.

61. A system comprising:
- a host system including a host memory and a host processor configured to be operated in an active mode and in a standby mode, the host processor consuming less power when operated in the standby mode than in the active mode;
- a WiFi system including
  - a computer-readable memory storing instructions to control operations of the WiFi system,
  - an embedded memory configured for storing one or both of code and data usable during the operations of the WiFi system, and
  - an embedded processor configured by the instructions in the computer-readable memory to, when the host processor is operating in the standby mode:
    - identify a page fault responsive to a request for a page that is not in the embedded memory,
    - identify, using a machine learning transition probabilities model, a predicted page predicted to be requested within a threshold amount of time after the page,
    - fetch the page and prefetch the predicted page as a single batch from the host memory, and
    - store the page and the predicted page in the embedded memory; and
- a communications bus configured to transfer at least the page and the predicted page between the host memory and the embedded memory.

62. The system of Clause 61, wherein the WiFi system comprises a WiFi system on a chip, and wherein the computer-readable memory, the embedded memory, and the embedded processor are integrated into the chip.

63. The system of any one of Clauses 61-62, wherein the machine learning transition probabilities model comprises a set of page transition probabilities generated based on historical page usage data.

64. The system of Clause 63, wherein the WiFi system is configured to log the historical page usage data based on pages used by the WiFi system when the host processor is operating in the standby mode.

65. The system of Clause 64, wherein one of the host system and the WiFi system is configured to train the machine learning transition probabilities model using the historical page usage data when the host processor is operating in the active mode.

66. The system of any one of Clauses 63-65, wherein the historical page usage data represents pages used by a different WiFi system when a different host processor associated with the different WiFi system is operating in the standby mode, wherein a remote computing device is configured to train the machine learning transition probabilities model based on the historical page usage data, and wherein the WiFi system receives the machine learning transition probabilities model over a network.

67. The system of Clause 66, wherein the WiFi system is configured to log additional historical page usage data based on pages used by the WiFi system when the host processor is operating in the standby mode, and wherein one of the host system and the WiFi system is configured to re-train the machine learning transition probabilities model using the additional historical page usage data when the host processor is operating in the active mode.

68. The system of any one of Clauses 63-67, wherein the set of page transition probabilities are generated based on Markov model analysis of the historical page usage data.

69. The system of any one of Clauses 61-68, wherein the instructions configure the embedded processor to fetch the page and the predicted page from the host memory into the embedded memory without waking the host processor from the standby mode.

70. The system of any one of Clauses 61-69, wherein the instructions configure the embedded processor to:
- determine that a process using the page and the predicted page has completed;
- evict the page and the predicted page from the embedded memory; and
- power down a portion of the embedded memory previously used to store the page and the predicted page.

71. A method comprising, under control of one or more computing devices:
- establishing communications between an embedded processor of a system on chip and a host system, the system on chip and the host system cooperatively operating within a device, the system on chip including an embedded processor and an embedded memory comprising pageable memory, the host system including a host memory and a host processor configured to be operated in at least a standby mode;
- identifying, via the system on chip, that the host processor is operating in the standby mode; and
- in response to identifying that the host processor is operating in the standby mode:
  - identifying a request for a page that is not in the embedded memory,
  - identifying, using a machine learning transition probabilities model, a predicted page predicted to be requested within a threshold amount of time after the page,
  - fetching the page and prefetching the predicted page together from the host memory, and
  - storing the page and the predicted page in the embedded memory.

72. The method of Clause 71, further comprising generating the machine learning transition probabilities model as a set of page transition probabilities, at least one of the page transition probabilities of the set of page transition probabilities representing a probability of requesting the predicted page within the threshold amount of time after the first page.

73. The method of Clause 72, wherein the threshold amount of time is one millisecond, the method further comprising identifying the predicted page based on the probability being at least 90%.

74. The method of any one of Clauses 72-73, further comprising generating the set of page transition probabilities based on applying a Markov model to historical page usage data.

75. The method of Clause 74, further comprising logging the historical page usage data based on pages used by the system on chip when the host processor is operating in the standby mode.

76. The method of Clause 75, wherein one of the host system and the WiFi system is configured to train the machine learning transition probabilities model using the historical page usage data when the host processor is operating in an active mode, the host processor consuming more power when operated in the active mode than in the standby mode.

77. The method of any one of Clauses 71-76, further comprising, in response to identifying that the host processor is operating in the standby mode:
- evicting pages previously stored in the pageable memory;
- identifying a page fault responsive to the request for the page; and identifying the predicted page responsive to identifying the page fault.

78. A system on chip comprising:
a computer-readable memory storing instructions to control operations of the system;
an embedded memory configured for storing one or both of code and data usable during the operations of the system, the embedded memory including a resident memory portion and a pageable memory portion; and
an embedded processor configured by the instructions in the computer-readable memory to:
determine, via a communications bus, whether a host processor of a host system external to the system on chip is operating in a standby mode or an active mode, and
in response to determining that the host processor is operating in the standby mode, prefetch at least one predicted page into the pageable memory portion from a host memory of the host system before the at least one predicted page is requested for use by a program running on the system on chip.

79. The system on chip of Clause 78, wherein, to prefetch the at least one predicted page, the embedded processor is configured by the instructions in the computer-readable memory to:
identify a page fault responsive to a request for a page that is not in the embedded memory;
identify, using a machine learning transition probabilities model, the at least one predicted page as predicted to be requested within a threshold amount of time after the page;
fetch the page and prefetch the at least one predicted page as a single batch from the host memory; and
store the page and the at least one predicted page in the pageable memory portion.

80. The system on chip of any one of Clauses 78-79, wherein, to prefetch the at least one predicted page, the embedded processor is configured by the instructions in the computer-readable memory to:
identify a set of standby mode pages including the at least one predicted page; and
prefetch the set of standby mode pages from the host memory; and
store the set of standby mode pages in the pageable memory portion.

81. The system on chip of Clause 80, wherein the embedded processor is configured by the instructions in the computer-readable memory to prefetch the set of standby mode pages from the host memory before beginning standby mode operations with the host processor operating in the standby mode.

82. The system on chip of any one of Clauses 80-81, wherein one of the computer-readable memory and the resident memory is configured to maintain a database including an index of the set of standby mode pages, the index generated based on machine learning analysis of historical page usage data representing pages used by the system on chip while the host processor is operating in the standby mode.

83. The system on chip of any one of Clauses 80-82, wherein, in response to determining that the host processor is operating in the standby mode, the instructions configure the embedded processor to maintain power to the resident memory portion, maintain power to any used portions of the pageable memory, and power down any unused portions of the pageable memory portion.

84. The system on chip of Clause 83, wherein the instructions configure the embedded processor to identify the set of standby mode pages at least partly by selecting enough pages to fill any memory banks in the used portions of the pageable memory.

85. The system on chip of any one of Clauses 78-84, wherein the instructions configure the embedded processor to prefetch the at least one predicted page into the pageable memory portion from the host memory without waking the host processor from the standby mode.

86. A device comprising:
a host system including a host processor configured to be operated in a sleep state and a host memory;
a system on chip including:
a computer-readable memory storing instructions to control operations of the system on chip,
an embedded memory configured for storing pages usable during the operations of the system on chip, and
an embedded processor configured by the instructions in the computer-readable memory to, in response to determining that the host processor is operating in the sleep state, prefetch a predicted page into the embedded memory from the host memory before the predicted page is requested for use by a program running on the system on chip; and a communications channel configured to provide data communications
between at least the embedded memory of the system on chip and the host memory.

87. The device of Clause 86, wherein a chip comprises the system on chip, wherein the chip comprises a single wafer of semiconductor material, and wherein the embedded processor and the embedded memory are formed as electronic components in the semiconductor material.

88. The device of Clause 87, wherein the system on chip comprises a WiFi system.

89. The device of any one of Clauses 86-88, wherein, to prefetch the predicted page, the embedded processor is configured by the instructions in the computer-readable memory to:
identify a page fault responsive to a request for a page that is not in the embedded memory;
identify, using a machine learning transition probabilities model, the predicted page as predicted to be requested within a threshold amount of time after the page;
fetch the page and prefetch the at least one predicted page as a single batch from the host memory; and
store the page and the at least one predicted page in the embedded memory.

90. The device of any one of Clauses 86-89, wherein, to prefetch the predicted page, the embedded processor is configured by the instructions in the computer-readable memory to:
identify a set of standby mode pages including the at least one predicted page; and
prefetch the set of standby mode pages from the host memory; and
store the set of standby mode pages in the embedded memory.

91. The device of Clause 90, wherein the system on chip is configured to maintain a database including an index of the set of standby mode pages, the index generated based on machine learning analysis of historical page usage data representing pages used by the system on chip while the host processor is operating in the sleep state.

Terminology

In the above description, reference numbers may have been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor or any commercially available processor, controller, microcontroller or state machine. A processor may also be implemented as a combination of computing devices (e.g., a combination of a DSP and a microprocessor, a plurality of microprocessors, one or more microprocessors in conjunction with a DSP core, or any other such configuration).

In one or more aspects, the functions described may be implemented in hardware, software, firmware, or any combination thereof. If implemented in software, the functions may be stored on or transmitted over as one or more instructions or code on a computer-readable medium.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A system comprising:
a host system including a host processor configured to be operated in a sleep state and a host memory;
a wireless system including:
a computer-readable memory storing instructions to control operations of the wireless system,
an embedded processor configured by the instructions in the computer-readable memory, and
an embedded memory configured for storing one or both of code and data usable during the operations of the wireless system, the embedded memory including a resident memory portion and a pageable memory portion; and
a communications bus configured to provide data communications between at least the embedded memory and the host memory;
wherein the instructions configure the embedded processor to fetch a page from the host memory into the pageable memory portion without waking the host processor from the sleep state, and to operate the communications bus in at least a full power state and a lower power state.

2. The system of claim 1, wherein the wireless system comprises a wireless system on a chip, and wherein the computer-readable memory, the embedded processor, and the embedded wireless memory are integrated into the chip.

3. The system of claim 1, wherein the instructions configure the embedded processor to power down vacant portions of the pageable memory.

4. The system of claim 1, wherein the instructions configure the embedded processor to transition the communications bus between the lower power state and the full power state by sending a clock request signal to an additional processor of the host system that consumes less power during operations than the host processor.

5. The system of claim 4, wherein the additional processor is configured to act as a proxy bus master without waking the host processor when the host processor is being operated in the sleep state.

6. The system of claim 1, wherein the host system comprises a power manager, and wherein the communications bus comprises a Peripheral Component Interconnect Express (PCie) communications bus configured to send a direct vote to the power manager of the host system.

7. The system of claim 6, wherein the instructions configure the embedded processor to fetch the page from the host memory without waking the host processor from the sleep state by sending the direct vote from the PCie communications bus to the power manager of the host system.

8. A method comprising, under control of one or more computing devices:
  determining, via an embedded processor of a system on chip, to fetch a page from a host memory of a host system including the host memory and a host processor configured to be operated in a sleep state;
  identifying that the host processor is operating in the sleep state; and
  in response to identifying that the host processor is operating in the sleep state, fetching the page from the host memory into an embedded memory of the system on chip without waking the host processor from the sleep state;
  wherein fetching the page comprises transitioning a communications bus from a low power state to a full power state, and operating the communications bus to transfer the page from the host memory into the embedded memory.

9. The method of claim 8, wherein transitioning the communications bus comprises sending a clock request signal to an additional processor of the host system that consumes less power during operations than the host processor, wherein the additional processor is configured to act as a proxy bus master without waking the host processor when the host processor is being operated in the sleep state.

10. The method of claim 8, wherein the host system comprises a power manager, and wherein the communications bus comprises a Peripheral Component Interconnect Express (PCIe) communications bus configured to send a direct vote to the power manager of the host system, wherein fetching the page from the host memory without waking the host processor from the sleep state comprises sending the direct vote from the PCIe communications bus to the power manager of the host system.

11. A system on chip comprising:
  a computer-readable memory storing instructions to control operations of the system;
  an embedded processor configured by the instructions in the computer-readable memory; and
  an embedded memory configured for storing one or both of code and data usable during the operations of the system, the embedded memory including a resident memory portion and a pageable memory portion;
  wherein the instructions configure the embedded processor to:
    transfer, via a communications bus, a page between the pageable memory portion and a secondary memory of a host system outside of the system on chip without waking a host processor associated with the secondary memory;
    operate the communications bus in at least a full power state and a lower power state; and
    transition the communications bus between the lower power state and the full power state by sending a clock request signal to an additional processor of the host system that consumes less power during operations than the host processor, wherein the additional processor is configured to act as a proxy bus master without waking the host processor when the host processor is being operated in the sleep state.

12. The system on chip of claim 11, wherein the host system comprises a power manager, wherein the communications bus comprises a Peripheral Component Interconnect Express (PCIe) communications bus configured to send a direct vote to the power manager of the host system, and wherein the instructions configure the embedded processor to fetch the page from the host memory without waking the host processor from the sleep state by sending the direct vote from the PCIe communications bus to the power manager of the host system.

13. The system on chip of claim 11, wherein a chip comprises the system on chip, wherein the chip comprises a single wafer of semiconductor material, and wherein the embedded processor and embedded memory are formed as electronic components in the semiconductor material.

14. The system on chip of claim 11, wherein the instructions configure the embedded processor to power down vacant portions of the pageable memory.

15. The system on chip of claim 14, wherein the instructions configure the embedded processor to:
  fetch the page into the pageable memory portion from the secondary memory in response to identifying a need for the page during operations of the system; and
  evict the page from the pageable memory in response to determining that the page is no longer needed.

16. A device comprising:
  a host system including a host processor configured to be operated in a sleep state and a host memory;
  a system on chip including:
    a computer-readable memory storing instructions to control operations of the system on chip,
    an embedded processor configured by the instructions m the computer-readable memory, and
    an embedded memory configured for storing pages usable during the operations of the system on chip; and
  a communications channel configured to provide data communications between at least the embedded memory of the system on chip and the host memory;
  wherein the instructions configure the embedded processor to transfer a page between the embedded memory and the host memory without waking the host processor from the sleep state, and to operate the communications bus in at least a full power state and a lower power state.

17. The system of claim 16, wherein a chip comprises the system on chip, wherein the chip comprises a single wafer of semiconductor material, and wherein the embedded processor and embedded memory are formed as electronic components in the semiconductor material.

18. The system of claim 17, wherein the system on chip comprises a wireless system.

19. The system of claim 16, wherein the embedded memory comprises a resident memory portion and a pageable memory portion, wherein the instructions configure the embedded processor to power down vacant portions of the pageable memory.

20. The system of claim 19, wherein the instructions configure the embedded processor to:

fetch the page into the pageable memory portion from the secondary memory in response to identifying a need for the page during operations of the system; and evict the page from the pageable memory in response to determining that the page is no longer needed.

21. The system of claim 16, wherein the instructions configure the embedded processor to transition the communications bus between the lower power state and the full power state by sending a clock request signal to an additional processor of the host system that consumes less power during operations than the host processor.

22. The system of claim 21, wherein the additional processor is configured to act as a proxy bus master without waking the host processor when the host processor is being operated in the sleep state.

23. The system of claim 16, wherein the host system comprises a power manager, and wherein the communications bus comprises a Peripheral Component Interconnect Express (PCIe) communications bus configured to send a direct vote to the power manager of the host system.

24. The system of claim 23, wherein the instructions configure the embedded processor to fetch the page from the host memory without waking the host processor from the sleep state by sending the direct vote from the PCIe communications bus to the power manager of the host system.

25. The system of claim 24, wherein the instructions configure the embedded processor to directly access the page in the host memory via the PCIe communications bus.

* * * * *